INVENTOR
W. A. MALTHANER
BY William F. Simpson
ATTORNEY

INVENTOR
W. A. MALTHANER
BY William F. Simpson
ATTORNEY

TELEPHONE SWITCHING SYSTEM EMPLOYING REPETITIVE IMPULSING
Filed June 29, 1948 14 Sheets-Sheet 3
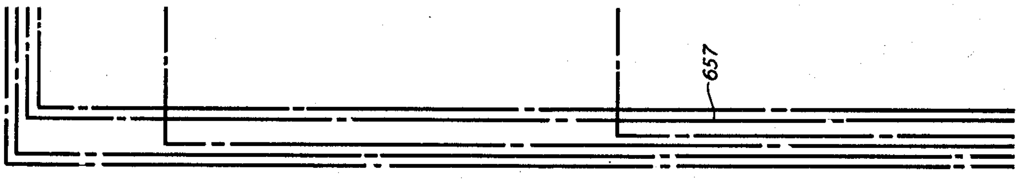
FIG. 4
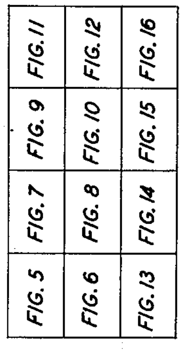
FIG. 5
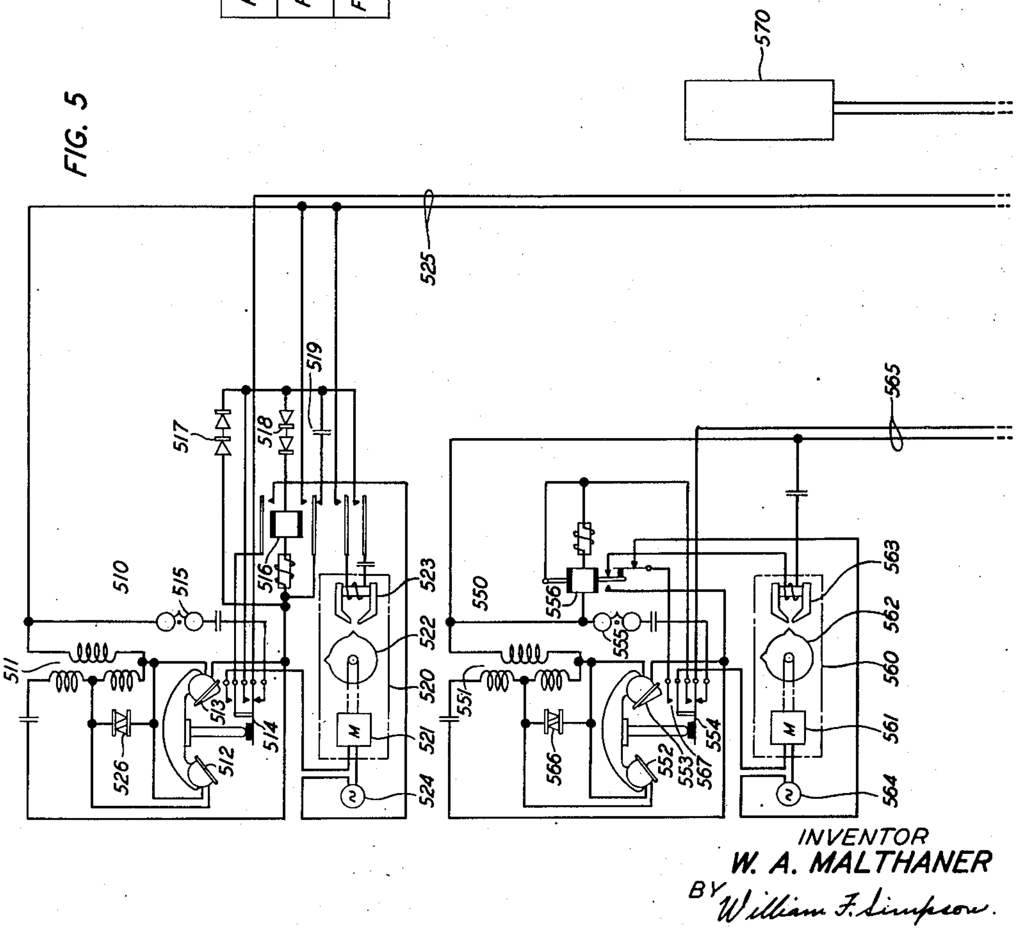
INVENTOR
W. A. MALTHANER
BY William F. Simpson
ATTORNEY Dec. 2, 1952 W. A. MALTHANER 2,620,399

TELEPHONE SWITCHING SYSTEM EMPLOYING REPETITIVE IMPULSING

Filed June 29, 1948 14 Sheets-Sheet 4

INVENTOR
W. A. MALTHANER
BY William F. Simpson
ATTORNEY

INVENTOR
W. A. MALTHANER
BY William F. Simpson
ATTORNEY

Dec. 2, 1952 W. A. MALTHANER 2,620,399

TELEPHONE SWITCHING SYSTEM EMPLOYING REPETITIVE IMPULSING

Filed June 29, 1948 14 Sheets-Sheet 6

INVENTOR
W. A. MALTHANER
BY William F. Simpson
ATTORNEY

INVENTOR
W. A. MALTHANER
BY William F. Simpson
ATTORNEY

INVENTOR
W. A. MALTHANER
BY William F. Simpson
ATTORNEY

Dec. 2, 1952 W. A. MALTHANER 2,620,399

TELEPHONE SWITCHING SYSTEM EMPLOYING REPETITIVE IMPULSING

Filed June 29, 1948 14 Sheets-Sheet 9

INVENTOR
W. A. MALTHANER
BY William F. Simpson
ATTORNEY

Dec. 2, 1952 W. A. MALTHANER 2,620,399

TELEPHONE SWITCHING SYSTEM EMPLOYING REPETITIVE IMPULSING

Filed June 29, 1948 14 Sheets-Sheet 10

INVENTOR
W. A. MALTHANER
BY William F. Simpson,
ATTORNEY

TELEPHONE SWITCHING SYSTEM EMPLOYING REPETITIVE IMPULSING

INVENTOR
W. A. MALTHANER
BY William F. Simpson
ATTORNEY

INVENTOR
W. A. MALTHANER
BY William F. Simpson
ATTORNEY

INVENTOR
W. A. MALTHANER
BY William F. Simpson
ATTORNEY

Dec. 2, 1952 W. A. MALTHANER 2,620,399

TELEPHONE SWITCHING SYSTEM EMPLOYING REPETITIVE IMPULSING

Filed June 29, 1948 14 Sheets-Sheet 14

INVENTOR
W. A. MALTHANER
BY William F. Simpson
ATTORNEY

Patented Dec. 2, 1952 2,620,399

UNITED STATES PATENT OFFICE 2,620,399

TELEPHONE SWITCHING SYSTEM EMPLOYING REPETITIVE IMPULSING

William A. Malthaner, Summit, N. J., assignor to Bell Telephone Laboratories, Incorporated, New York, N. Y., a corporation of New York Application June 29, 1948, Serial No. 35,925

29 Claims. (Cl. 179—18)

This invention relates to an improved telephone switching system for automatically establishing telephone transmission paths between subscribers' stations under control of equipment in each of the subscribers' stations.

It is an object of the present invention to provide improved switching and control circuits, methods and equipment for providing improved telephone service.

In telephone switching systems in the prior art, it has been the practice to provide each subscriber station with a telephone transmitting and receiving device as well as a calling device which is usually called a dial or dialing device. While a dialing device is almost universally used in telephone switching systems at the present time, nevertheless, it has certain drawbacks or disadvantages.

In the first place it requires an appreciable time for the subscriber to actuate the dial, and thereafter, it requires an appreciable interval for the dial to return to normal for each digit during which time the pulses representing the magnitude of the digit are transmitted to the central office. Thus, the time required by the subscriber is extended by the time required to transmit and record the pulses to the central office. Likewise, the time required to receive and record the called subscriber's number at the central office is lengthened by the time required by the subscriber or attendant to actuate the dial between each of the digits.

Furthermore, in switching systems in the prior art, signal currents representing the called subscriber's station designation or number are transmitted to the central station but once. In addition the subscriber has no way of checking the accuracy of the number transmitted or determining the portion of the number actually transmitted to the central office with the result that in case of error by either the subscriber's or by the central office equipment, a wrong number will result.

In addition, the usual dial pulses are formed by interrupting direct current supplied over the subscriber's line. These pulses have a direct-current component and other low frequency components which components are unsuitable for transmission without change over the voice frequency paths of toll lines, carrier current channels, and the like.

An object of the invention is to provide improved methods, apparatus and equipment for more rapidly establishing communication paths through the equipment at the central office, and thus materially reduce the holding time of the expensive controlling equipment. In this manner the efficiency of the use of the equipment is increased with the resultant lower cost of establishing each connection therethrough.

Another object of the invention is to provide improved methods, circuits and equipment for more accurately establishing connections through the equipment, first, by arranging the subscriber's calling apparatus so that the subscriber may set up the number of the called party on the equipment and then check the setting of the equipment before placing the call.

Another object of this invention is to improve methods, circuits and apparatus for more accurately establishing connections through switching equipments by repeatedly transmitting the number to the central office where the received number may be checked to insure that it has been properly received. If the number is improperly received the recorded number will be disregarded and the next time it is transmitted from the subscriber's station it will again be recorded and if properly received employed to control the establishment of a connection. Then, after all the selections have been made to establish a path through all the switching equipments to the called subscriber's station, the calling device at the calling subscriber's station is automatically disconnected from the line to the central station and the telephone transmitting and receiving equipment connected to the line.

In United States Patent 2,232,398 granted to Lundstrom on February 18, 1941 a rectifier bridge is employed to interconnect the various signaling and talking apparatus to the line and to reduce the effects of these devices upon each other. However, the devices are never disconnected from the line and each introduces transmission loss to the currents of the other and still may produce other undesirable interference.

A feature of this invention relates to switching apparatus for removing either one or the other of these devices from the line at all times thus preventing all interference between them.

A feature of the invention relates to a switching system incorporating switching and control circuits and apparatus wherein all idle paths through the switching apparatus are marked and electronic tubes arranged in lock-out circuits employed to rapidly test all the thus marked idle paths through the switching equipment and select one of them. Such switching and control circuits and apparatus are disclosed in a patent application of E. Bruce and N. I. Hall filed on October 29, 1947, Serial No. 782,704, now Patent No. 2,582,959, the disclosure of which is incorporated herein by reference to the same extent as if fully set forth herein.

Another feature of this invention relates to the use of the subscriber's calling apparatus and equipment such as shown in a patent application of Parkinson Serial No. 35,930, filed on June 29, 1948, now Patent No. 2,597,898, wherein each of the digital positions of the calling subscriber's number is represented by two pulses variably spaced in time one from another and wherein the time elapsing between the two pulses representing each digital position of a number represent the magnitude of the respective digits or the character or characteristics of the letter of the alphabet or another symbol in the respective positions in the number. The above-identified application of Parkinson is hereby incorporated herein by reference to the same extent as if fully set forth herein.

Another feature of the invention is directed to equipment for receiving such pulses of the type disclosed in a patent application of Malthaner-Newby-Vaughn Serial No. 35,924, filed on June 29, 1948, the disclosure of which is made a part hereof by reference as if fully set forth herein. Novel features disclosed herein but not claimed herein may be claimed in the above-identified applications.

Another feature of the invention relates to control circuits for coordinating the operation of all the circuits and arranging them to cooperate one with another in the rapid and efficient use of the subscriber's time and also the time of the control equipment at the central office, thus materially reducing the time required to and cost of establishing each connection through the switching equipment.

Briefly, in accordance with an exemplary embodiment of this invention circuits and equipment are arranged so that a subscriber in initiating a call first sets his calling device or equipment in accordance with the number or other symbols designating the called subscriber's station. Thereafter, the subscriber will place his call by picking up the receiver or handset in the usual manner at which time the subscriber's calling equipment is connected to and maintained connected to the line extending to the central station. The subscriber in initiating a call will set into operation the equipment at the central station for extending his line to call receiving and recording equipment. When this connection is established pulses transmitted from these subscriber's calling equipment will be received, recorded and checked by the receiver. Thereafter, the recorded pulses are employed to selectively control switches to extend the subscriber's connection to the called subscriber's line. When the selection of the called subscriber's line is completed, the electrical condition or conditions applied to the calling subscriber's line are changed which change disconnects the subscriber's calling equipment from the line and connects the telephone transmitting and receiving equipment thereto. If the called line is busy the subscriber will then receive a busy tone whereupon the subscriber will hang up. If the subscriber desires to call at a later date it should be noted that his calling equipment is already set to the desired number so that he may again place the same call by again merely lifting the receiver from the hook or picking up the handset, as the case may be, whereupon the circuits again operate as described above. If the called line is idle ringing current is applied to it. When and if the subscriber answers the ringing current is removed from his line; the proper electrical condition applied to the line to cause the telephone transmission apparatus at the called subscriber's station to be connected to his line; and, the communication path between the subscribers established so that they may communicate with each other. At the completion of the call the circuits and apparatus are all returned to their normal or idle condition.

The foregoing and other objects and features of this invention, the novel features of which are specifically set forth in the claims appended hereto, may be more readily understood from the following description when read with reference to the attached drawings in which:

Figs. 1 and 2 show in outline form the various elements of an exemplary system embodying the present invention and the manner in which they cooperate one with another;

Fig. 3 shows the manner in which Figs. 1 and 2 are arranged adjacent one another to illustrate the exemplary system set forth herein;

Fig. 4 shows the manner in which Figs. 5 to 16 are arranged adjacent one another; and Figs. 5 to 16 show in greater detail the various elements and the manner in which they cooperate to form an exemplary system embodying the present invention.

It should be noted that the term "calling" as used in this disclosure is not limited to completed calls. The term "call" as used in the telephone art includes completed calls, calls in which the busy tone is received, and calls for which the ringing tone is received but no answer is received from the called party. The term "call" as used in this disclosure, and in the automatic telephone switching field in general, may generally be said to include any operation by the calling party in which he causes his telephone to make connection with, and to control the operation of, the switching apparatus in the central office.

Figures 1, 3:
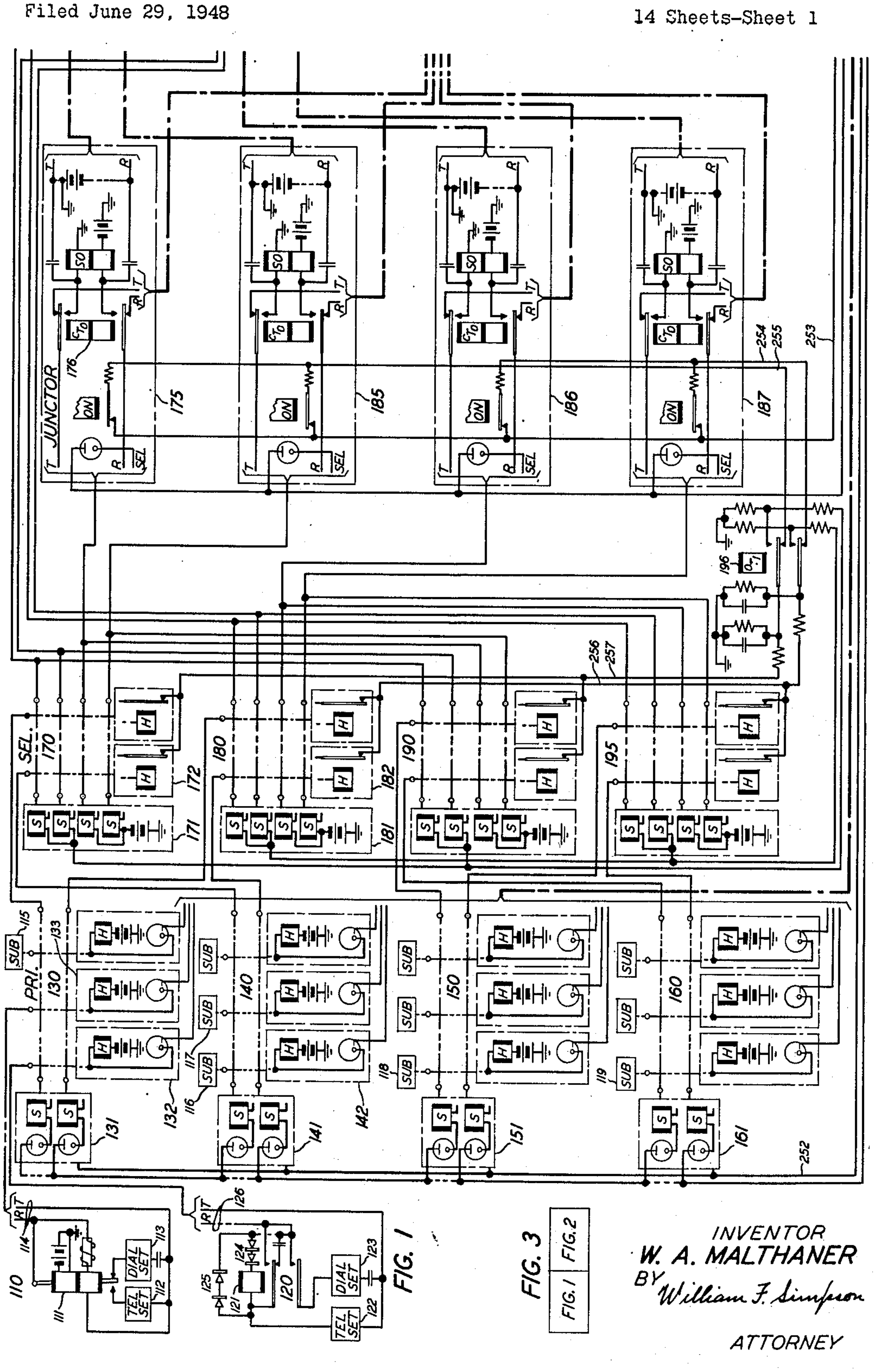

Twelve subscriber stations are shown in Fig. 1. one subscriber station is illustrated generally by the reference numeral 110 and another is shown at 120. The other subscriber stations are indicated by rectangles such as 115, 116, 117, 118, 119, etc. While only twelve subscriber stations are actually shown in the drawing it is to be understood that any suitable or desired number may be provided without departing from the present invention or the exemplary system set forth in detail herein disclosing such a system.

The subscriber's station shown generally at 110 is connected to line 114 extending to the central switching station. This subscriber's station comprises a telephone set 112 which includes a transmitter and receiver and other equipment normally provided as part of a telephone subscriber's phone set. The subscriber's equipment 110 also includes a dial or calling device 113. While this invention is not limited to the exemplary system set forth herein, the system is arranged to cooperate with a calling device of the type set forth in the above-identified application of Parkinson.

The subscriber station 110 also includes a polarized relay 111 which is employed to connect either the telephone set 112 or the calling device 113 to the transmission line 114 extending to the central switching station. Relay 111 is controlled over the line 114 extending to the central switching station as will be described hereinafter.

The subscriber station 120 is similar to subscriber station 110. Telephone set 122 is provided and includes a telephone transmitter and receiver which is employed in the usual manner to talk over the telephone. Likewise, calling set 123 is also provided to signal and control the central switching station to set up a desired telephone transmission path to the called subscriber station.

In the case of the subscriber station 120 however, a neutral relay 121 is provided instead of a polar relay as shown at station 110. When a neutral relay 121 is employed it is necessary to provide rectifiers 124 and 125 to cause the relay 121 as well as the other subscriber station equipment and central station apparatus to respond in the proper manner to the various circuits as will be described hereinafter.

The switching equipment at the central station comprises a plurality of cross-bar switches and associated controlling circuits as well as circuits responding to the signal set out by the calling devices 113, 123 and similar devices at the other subscribers' stations. A typical cross-bar switch is described in detail in United States Patent 2,021,329 granted to Reynolds on November 19, 1935, the disclosure of which patent is hereby made a part of the present application as if fully set forth herein.

As set forth in the above-identified application of Bruce-Hall, Serial No. 782,704, filed October 29, 1947 cross-bar switches are arranged in groups. Briefly, as shown in Fig. 1 cross-bar switches 130 and 140 show two switches of one primary group of cross-bar switches, while switches 150 and 160 represent two switches of a second primary switch group. Only two switches in each of two primary switching groups are shown in the drawing. It will be readily apparent that the usual arrangement will comprise up to ten primary switches and multiples thereof in one primary group. As many primary groups may be provided as desired. Switches 170 and 180 represent two switches of a secondary group of switches. Likewise, switches 190 and 195 represent two other secondary switches of a second secondary group of switches. Usually, as many groups of secondary switches will be provided as there are primary groups and secondary groups may comprise up to and including ten switches. Switches 210 and 220 represent two switches of a group of tertiary switches. As before, any suitable number of switches may be included in any suitable number of groups of tertiary switches. In addition to the foregoing switches, a switch 230 or a group of such switches are employed to connect the register circuit to receive the signal pulses designating the called subscriber station which have been transmitted over the subscriber's line to the central switching station. As set forth in the above-identified Reynolds patent each of the cross-bar switches is provided with a group of select magnets sometimes called horizontal magnets and another group of magnets called vertical or hold magnets. Operation of one select magnet and one hold magnet causes contacts at the cross-points of the operated select magnet and hold magnet to be actuated to establish a transmission path through that switch. Then after, the select magnet may be released without releasing the cross-point contacts. As long as the hold magnet remains operated the operated cross-point contacts remain operated. The hold magnets are designated H in the drawing and the select magnets S.

In addition, a cold cathode discharge tube is associated with each of the select magnets and each of the hold magnets in the primary switches. Other gas tubes and relays not shown in Fig. 1 are described in greater detail in the above-identified copending application of Bruce-Hall and are employed to aid in the control and seizing of idle paths through the switching system.

Each of the subscriber lines, such as 114 and 126 and the subscriber lines associated with others of the subscriber stations shown in Fig. 1, terminates in a vertical column of contacts on the primary line switches. Thus, line 114 from the subscriber station 110 terminates in the vertical associated with the hold magnet and control equipment 133. The subscriber line 126, extending to station 120, terminates in the vertical associated with the hold magnet and control equipment 132. Likewise subscriber stations 116 and 117, which are not shown in detail terminate, in vertical columns of switch 140. The other subscriber lines likewise terminate vertical columns of the above enumerated or other primary cross-bar switches. If desired, the subscriber's line could be connected to horizontal rows of contacts providing other minor changes are also made in the circuits.

In addition to the foregoing elements a group of circuits frequently called junctor circuits such as circuits 175, 185, 186, 187 are provided to aid in the establishment of transmission paths through the system as well as to supply talking battery after the connection has been selectively established. Likewise, the common release circuit 233 is provided to release the control circuits after each communication path has been established through the switches so that these control circuits may be employed to establish another path through the switching system. As is well understood, the release of the control equipment employed to establish a path through the system does not release the communication path established by these circuits. Instead, the path through the system is maintained under control of the subscribers as will be described hereinafter. Likewise, register control circuits 234 and 235 and associated pulse receiving and storing equipments 236 and 237 and 238 and 239 respectively have been provided to receive the pulses representing the called subscriber station and to select the path over which the call is to be routed to the called subscriber station.

As set forth in the above-identified application of Bruce-Hall all the paths which are idle between the subscriber's lines, or the primary switches, and a transmission or junctor circuit within or extending from within to without the central switching station are marked and then one idle path selected by gas tubes arranged in lock-out circuits.

Figure 2:
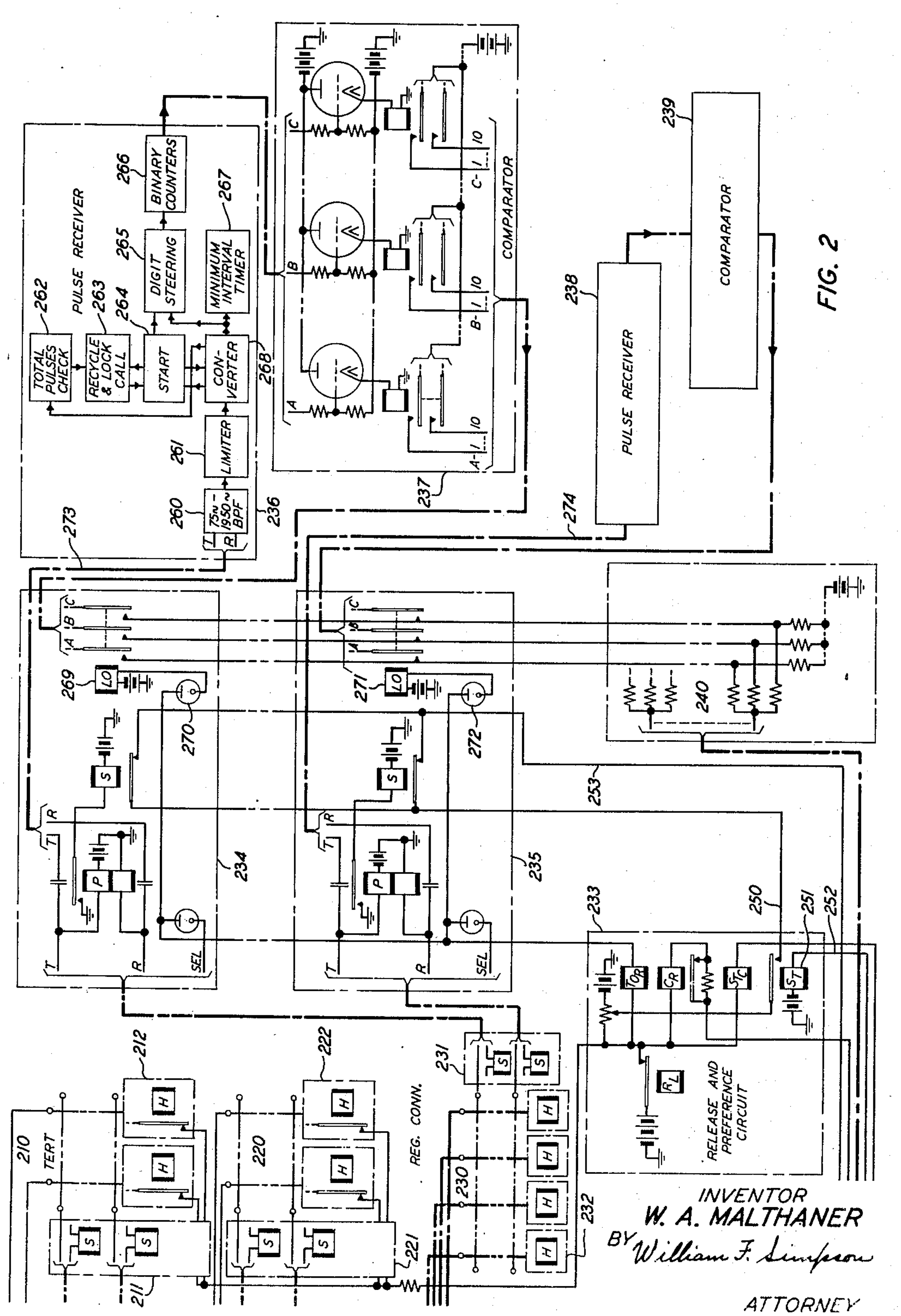
Figure 6:
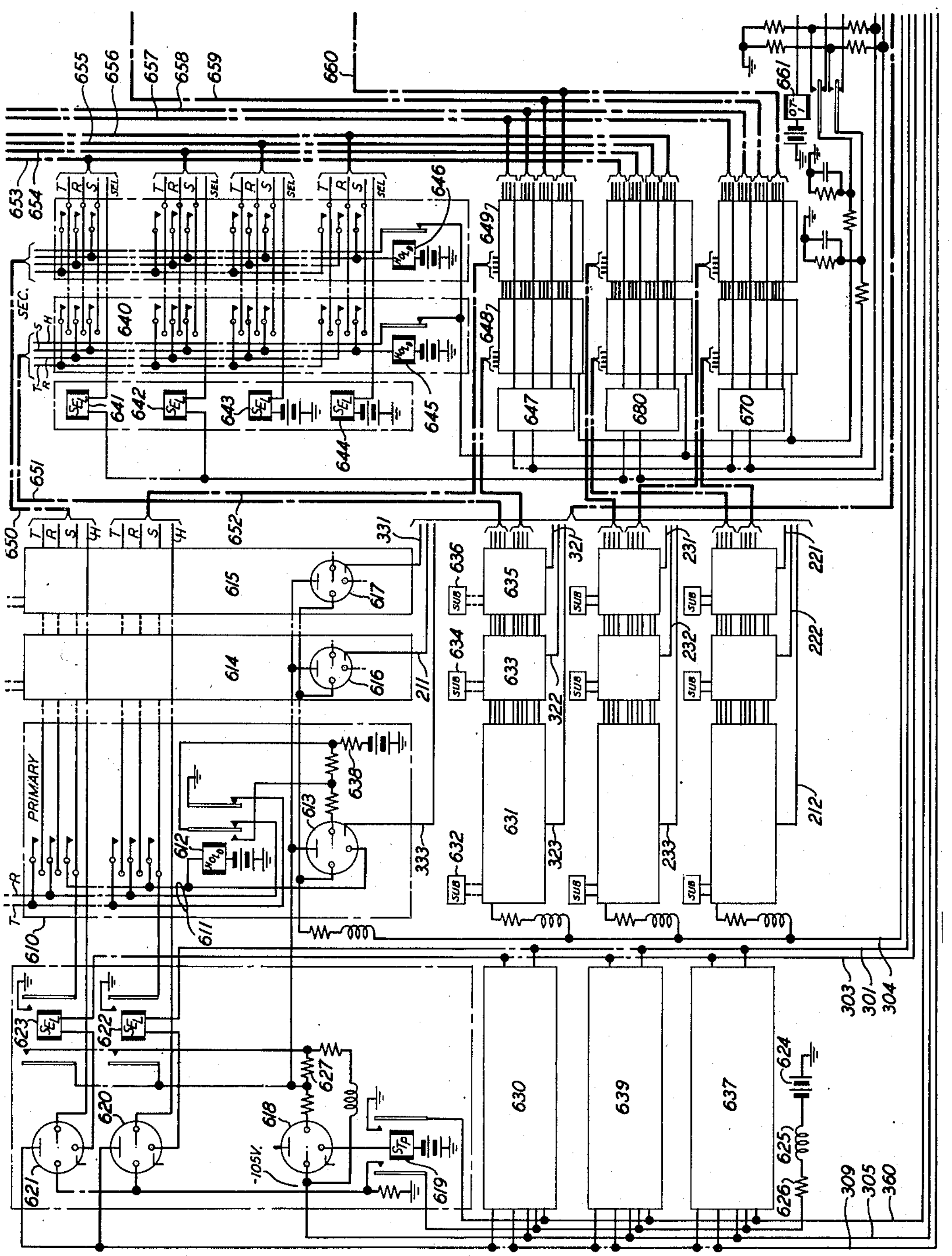
Figure 7:
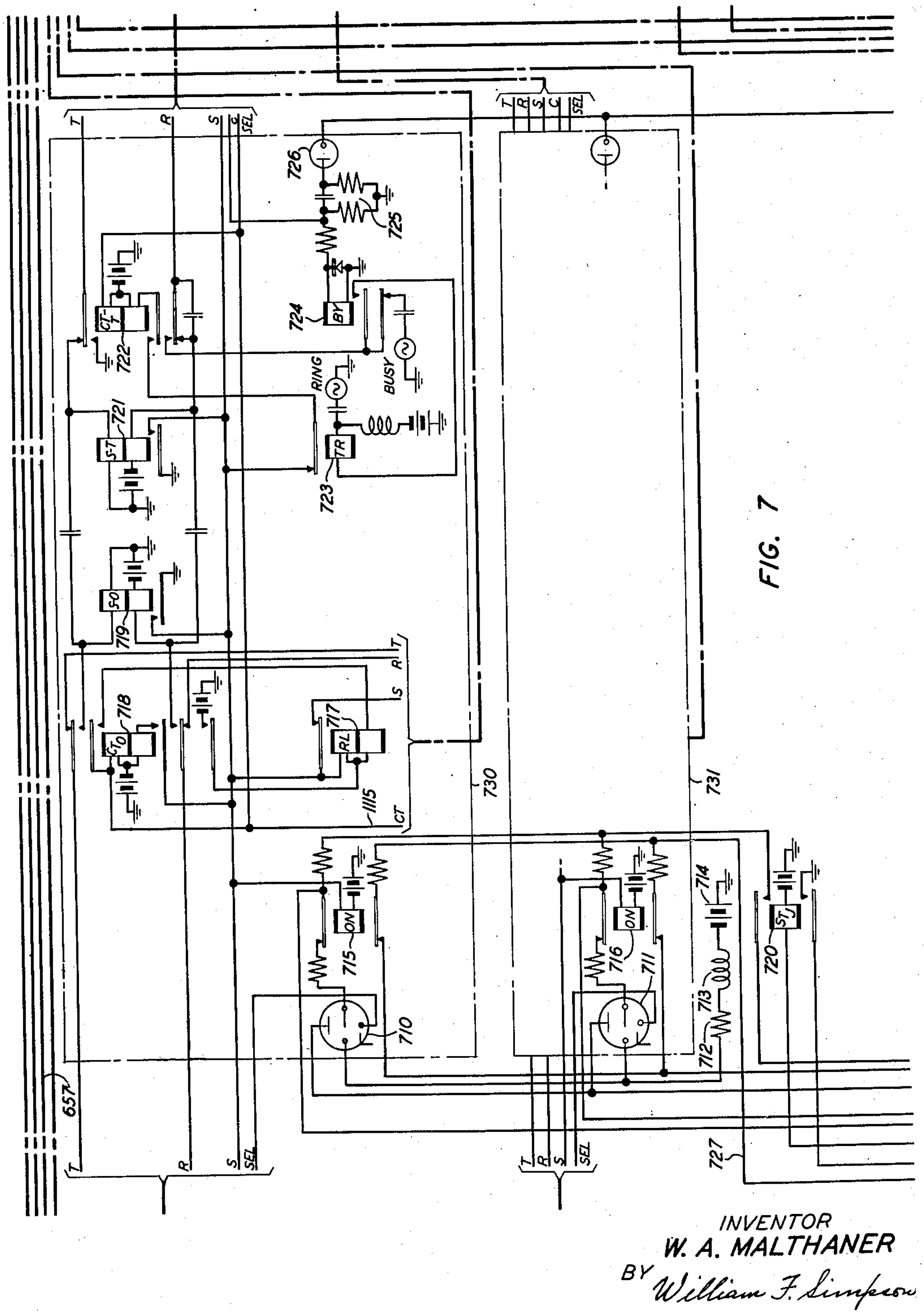
Figure 8:
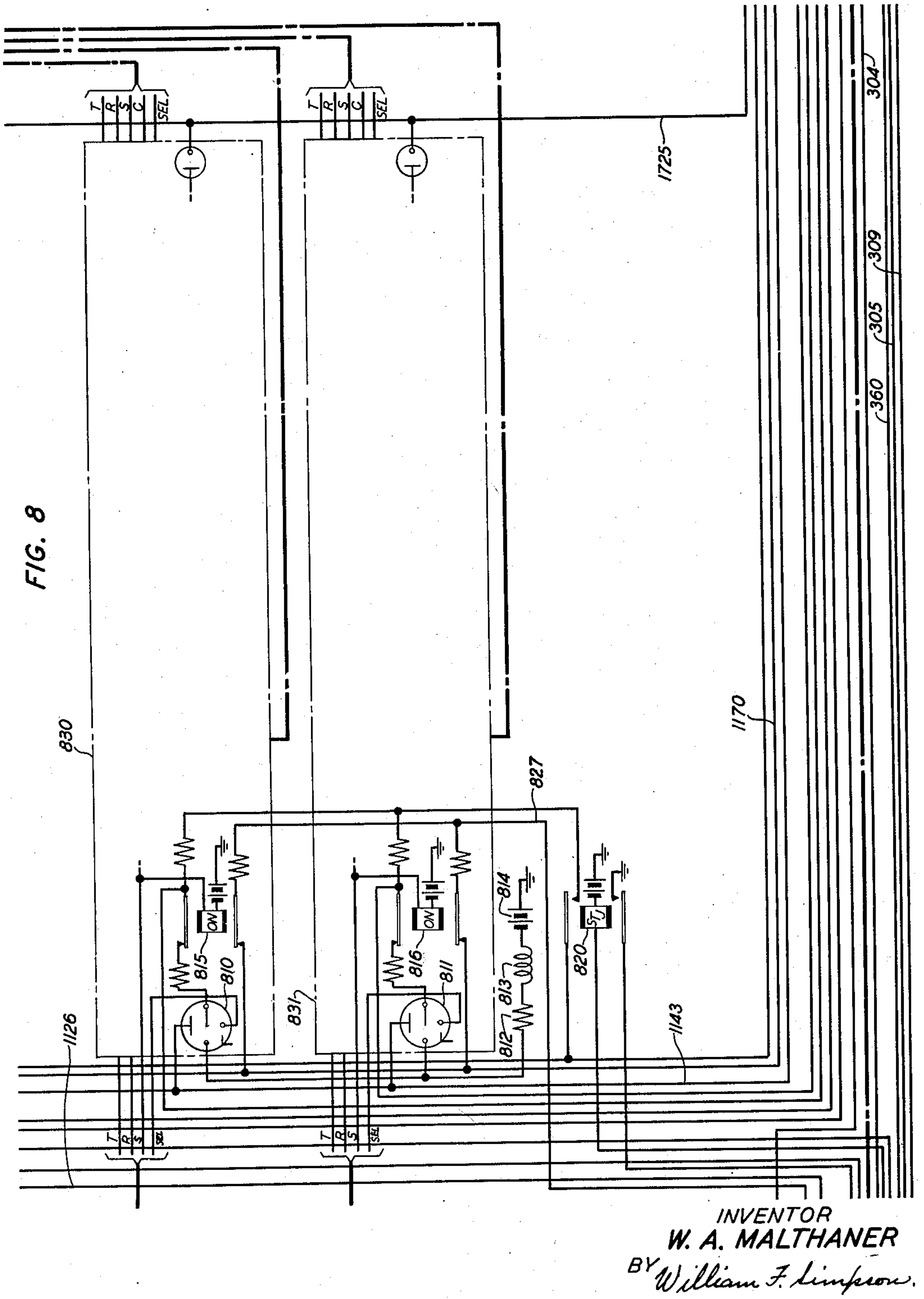
Figure 9:
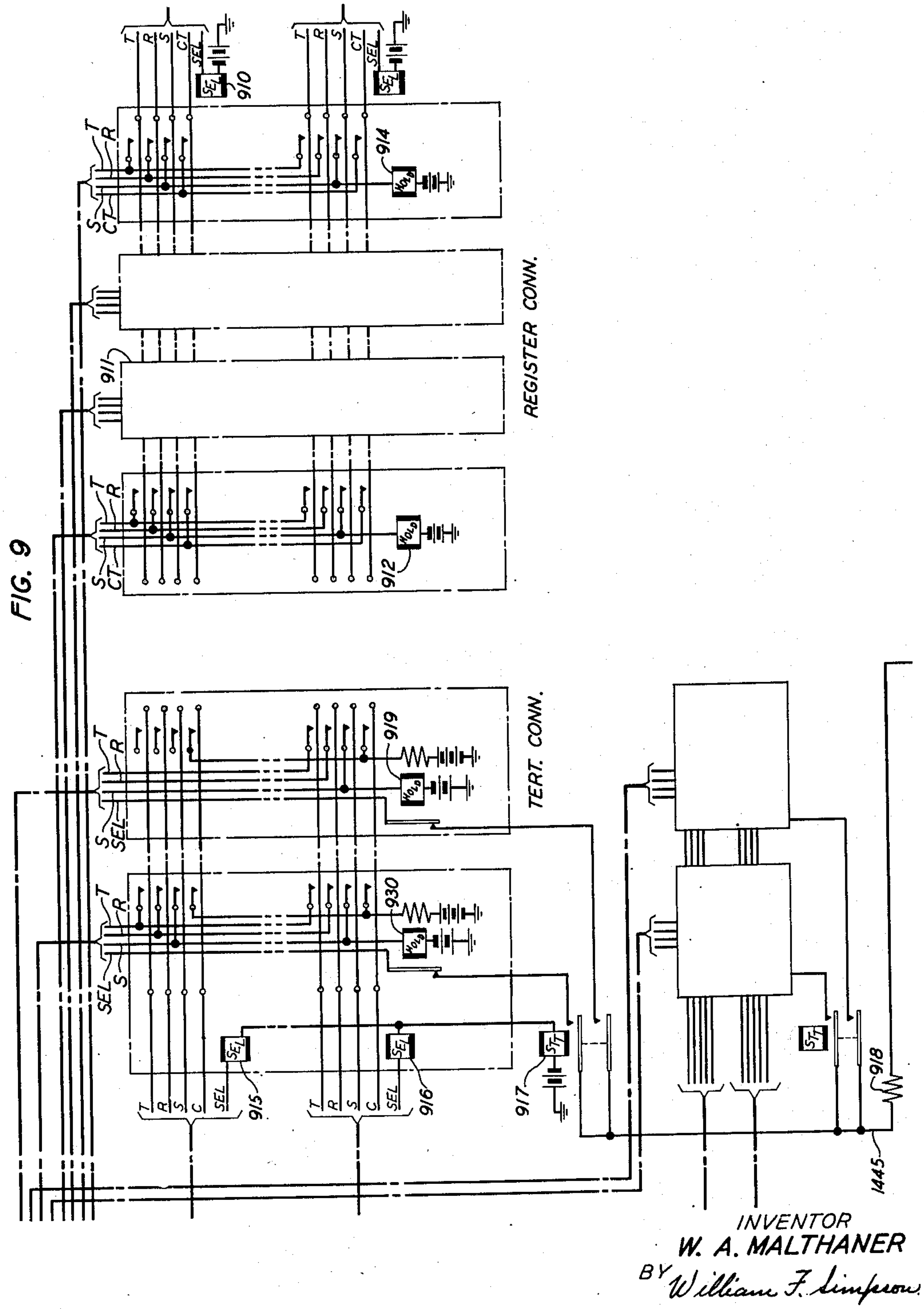

A pulse receiver 236 comprises the elements set forth in the above-identified application Malthaner et al. In addition, the called subscriber's designation or number is stored on a groups of relays connected to tubes in the comparison circuit 237 as shown in Fig. 2. If it is desired, the comparison circuit may be employed to check the received pulses and the operation of the system providing, of course, the called station's number is known at the central switching station before the pulses representing this number arrive at the central switch place.

Briefly, when the subscriber at station 110 for example, initiates a call the calling device 113 is first set in accordance with the number or designation of the called station and then this device is connected to the subscriber line 114 extending to the central switching office. Initiation of the call by the subscriber also initiates a discharge through the tube associated with this line in the control equipment 133. This tube in turn causes other circuits to be operated which in turn causes start relay 251 in the release and preference circuit 233 to operate. The operation of relay 251 applies potential to the conductor 250. This conductor extends through the contacts of a relay in each of the idle register circuits 234 and 235 and such other register circuits as may be provided to lead 253. If none of these register circuits are idle the potential applied to lead 250 is not applied to lead 253. However, when one of the registers becomes idle potential from the conductor 250 will be applied through contacts of the S relay of the register circuit which is idle. The circuit of lead 253 then extends through break contacts of the off-normal relays of junctors 175, 185, 186 and 187. As shown in Fig. 1 the junctor circuits are arranged in two groups, junctors 175 and 185, forming a part of one group, junctors 186 and 187 forming a part of another group. While only two junctors are shown in each of the two groups, it is to be understood that any suitable number of junctors may be provided and may be arranged in any desired number of groups. However, for purpose of illustrating a specific embodiment embodying the present invention, two junctors in each of two groups are shown in Fig. 1. The circuit from lead 253 thus extends through break contacts of relays of the two junctors of the first group, namely, 175 and 185 to conductor 255 and through similar break contacts in junctors 186 and 187 to lead 254. If none of the junctors are idle the circuits are incomplete with the result that no potential is supplied to either of leads 255 or 254. However, as set forth it is assumed that at least one junctor is idle. If one junctor in each group is idle then the potential from lead 253 is applied to conductors 254 and 255. Conductors 254 and 255 extend through break contacts on relay 196 to conductors 256 and 257. Conductors 256 and 257 extend to break contacts of the hold magnets associated with the secondary cross-bar switches. Thus conductor 256 extends to the break contacts of the hold magnets associated with switches 180 and 195 while conductor 257 extends through the break contacts of the hold magnets associated with switches 170 and 190. If the various vertical circuits of these switches are busy the hold magnet will be operated and thus will interrupt the connection from leads 256 or 257 through the break contacts of the operated hold magnets. However, if these elements are idle the hold magnet will be released and will extend the circuit from leads 256 and 257 to elements in the tubes associated with the horizontal rows of contacts of the primary cross-bar switches. Thus the potential from the conductor 250 and the start relay 251 of the release and preference circuit 233 extends over all idle paths between the primary line switches and the junctor circuits, providing of course there is an idle junctor, and an idle register for use in establishing a call from the subscriber station 110.

Inasmuch as the subscriber line 114 terminates on switch 130, it will be necessary to operate one of the tubes associated with the horizontal magnets in switch 130. In order to accomplish this it is also necessary to prevent an attempt to establish a call simultaneously through some other cross-bar switch, so the tubes associated with the horizontal magnets of all of the primary line switches are arranged in a lock-out circuit such that only one tube can operate at a time. Upon the operation or conduction of one of the tubes individual to a horizontal row of contacts of switch 130, a path is selected and then established through the switching system to a junctor circuit such as 175 and from the junctor circuit through the register connector switch or switches 230 to the register circuit 234 and pulse receiving apparatus 236 and 237. Negative battery is connected to the tip of the line extending to the subscriber station and ground is connected to the ring. The polar relay 111 at the subscriber station 110 has its windings connected to the line so that its armature will remain in contact with the right-hand contact as shown in the drawing when battery and ground are connected to the subscriber's line in this manner thus connecting and maintaining the calling or dialing equipment 113 connected to the subscriber line.

Upon the establishment of a communication path from calling equipment 113 at the subscriber's station 110 to the register equipment, say for example, 234, signaling pulses are transmitted from the calling equipment 113 to the register control circuit 234 and then over the tip and ring conductors designated by 273 in Fig. 2 to the receiving equipment 236. This equipment comprises a low-pass filter 260 and a limiter or gain regulator 261, converter circuit 268, start circuit 264, a counting circuit 262 for checking the total number of pulses received representing the called subscriber's station designation, digit steering or stepping circuit 265, and one or more counting circuits 266.

When desired or necessary, steering circuit 265 will be arranged to direct or steer the pulses representing the magnitude of the digit in each digital position of a subscriber's designation to the respective counting and storing circuits. Thus, in the case of an eight digital position designation, the steering circuit will direct or distribute pulses representing the magnitude of the digit in each of the digital positions of the proper one of eight counting and storing circuits.

The digital counter 266 is shown in the drawing. This is shown merely by way of example showing the position of the counting and storing circuits in the system and the manner in which the counting circuits cooperate with the other circuits and elements of an exemplary system. This counter represents any suitable or necessary number of orders of binary counting circuits from one to a maximum number of digital positions in a complete subscriber's designation. When it is necessary to set a call up through several exchanges in tandem it is not always necessary to employ all of the digits of the called subscriber's number at all of the exchanges. For example, the office code or name is all that is frequently employed in setting a call up through the first and intermediate exchanges whereas the last portion of the called subscriber's number is the only portion used in the final switching station. It is to be understood however that the number of digits employed at any switching station is a function of the size of a switching station as well as of the complexity of the switching required at that station. When, as in the usual case, it is only necessary to use a portion of the digital positions of a subscriber's designation at any one switching center the counting circuit 266 represents that portion which it is necessary or desirable to use at any one switching center. This porton may comprise the first one or more digital positions, one or more intermediate digital positions or one or more of the final digital positions of the subscriber's station designation. The counter as shown in the drawing may be employed to count and store pulses representing the magnitude of the digits in either consecutive or non-consecutive digital positions of the complete subscriber's designation.

The output of the counting circuits is applied to a plurality of vacuum tubes and associated storing relays shown with the rectangle 237. The above-described circuits operate in substantially the same manner as described in the above-identified application of Malthaner-Newby-Vaughan Serial No. 35,924, filed June 29, 1948.

A checking circuit 262 recognizes the complete set of pulses representing a subscriber's station designation. If the complete set of pulses as received at the switching station does not comprise the proper number of pulses, the equipment at the receiver is recycled by the recycle circuit 263 and the next series of pulses is employed to control a further operation of the system. If a proper number of pulses has been received the position or setting of the binary counters 266 is transferred to the relays in circuit 237 and a signal transmitted to the register control circuit 234 whereupon the lock-out relay 269 is operated through the gas tube 270 which is arranged in a lock-out circuit including other similar tubes and other registers such as tube 272 and register 235. The lock-out circuit is provided to prevent more than one register from seizing or using the number group circuit 240 at a time. When relay 269 operates it connects positive battery to three of the leads extending to the number group circuit 240. As set forth in the above-identified application of Bruce-Hall, Serial No. 782,704, filed October 29, 1947, the application of positive potential to three leads extending to the number group circuit selects the line circuit tube associated with the called subscriber's line and causes a discharge to be initiated through this tube. It should be pointed out that prior to the operation of lock-out relay 269 certain other circuits function to prevent the establishment of a connection from an incoming subscriber's line to another junctor register connector and register circuit.

It is also evident that there are ten leads from each of the register circuits extending to the number group circuit for each digit which is desired or necessary to employ at the switching office. If, as described in the above-identified application of Bruce and Hall, it is necessary to employ only three digits, thirty leads will extend from each of the relays 269 and 271, and similar relays of all of the other register circuits which may, of course, include more than the two shown, to number group circuit 240. Upon the application of positive potential to one lead in the hundred group and one lead in the ten group, and one lead in the unit group, one of the conductors extending from the number group circuit 240 to the subscriber's line tubes will have a sufficiently high positive voltage with respect to ground applied to it to initiate a discharge within the subscriber's line tube associated with the called line if the called line is idle. The initiation of a discharge through this subscriber's line tube identifies or marks the called party's line and causes the various circuits to function to establish a connection from the junctor to the called subscriber's station. If the called line is busy a discharge is not initiated in the line tube associated with the called party's line and as a result the circuits time out and send a busy signal which is transmitted to the calling subscriber's station and transmission apparatus.

In establishing connection to the called subscriber's line when it is idle the register circuit 234 causes the operation of the horizontal or select magnet of the tertiary cross-bar switch associated with the junctor 175. The operation of this magnet causes the operation of additional relays, which relays apply a potential through the break contacts of the hold magnets associated with the tertiary cross-bar switch to which the junctor circuit 175 is connected. The circuit through the break contacts of these hold magnets then extends through winding of some of the select magnets of the secondary switches through operated contacts of relay 196 to conductors 256 and 257 which in turn extend through break contacts of hold magnets associated with the secondary cross-bar switches and then to the discharge tubes associated with the horizontal rows of contacts of primary cross-bar switches. These tubes associated with the horizontal rows of the primary cross-bar switch are connected in a lock-out circuit arrangement which permits a discharge to be initiated through only one of these tubes whereupon one of the possible paths from the junctor 175 to the called party's line, as for example 120, is selected. Thereafter, the relays and magnets associated with this path are operated and establish a communication path from the junctor circuit 175 to the called subscriber's line which may be 126 for example. Upon the complete establishment of the above-identified path, the release circuit 233 is set into operation which in turn causes the register 234 to be disconnected and relays of junctor circuit 175, to operate. The operation of relay 176 in the junctor circuit 175 reverses the application of battery and ground to the tip and ring conductors extending to the calling subscriber's station 110. This reversal of polarity causes the polarized relay 111 at the calling subscriber's station 110 to be actuated so that its armature will now make contact with its left-hand contact instead of with its right-hand contact, thus interrupting the circuit to the calling equipment 113 and connecting the telephone receiving and other transmission apparatus to the line extending to the central switching station. If the called line is busy, a busy tone will then be transmitted to and received by the receiving equipment forming a part of the transmission equipment designated by 112 in Fig. 1. The subscriber upon noting this condition will replace his instrument on the hook or cradle and if desired, place the call again at a later time.

If the called line is idle, ringing current will be applied to it upon the establishment of the connection through the cross-bar switches as described above and as set forth in greater detail in the above-identified application of Bruce-Hall Serial No. 782,704. When the called party answers, the ringing is stopped and the communication between the two stations established. Upon the termination of communication between the two stations, the station equipment as well as the switching equipment in the central exchange is all restored to its normal or idle condition and is then available for use in establishing transmission paths for other calls in a manner similar to that described above.

While it is assumed that the call originates in station 110 for station 120 it will be readily apparent that the call can be made in either direction from either of these stations to the other or from either of these stations to any other station. Likewise all of the stations can be similar to station 110 or to station 120 and the system will work in substantially the same manner as described above.

It is also evident that any suitable type of switching equipment may be employed at the central station in cooperation with the subscriber's station calling device and the receiving circuit described herein and in the above-identified patents and applications made a part of the present application by reference.

An exemplary system embodying the present invention is shown in greater detail in Figs. 5 through 16, inclusive. Fig. 5 shows two subscriber's stations in detail and includes a third one 570. The two stations, one at 510 and the other at 550 are not identical. It is to be understood, of course, that all of the stations connected to the system may be of either type or they may be some of one type and some of another as shown in Fig. 5. The station 510 is provided with calling or dialing apparatus 520, telephone transmitting and receiving apparatus 512 and 513 and other types of equipment usually employed in telephone stations including the ringer 515, repeat or induction coil 511, switchhook contacts 514 and so forth. In addition a switching relay 516 is provided together with rectifiers 517 and 518. The above-mentioned devices are all well known in the art except perhaps the signal or calling device 520 which in the exemplary embodiment set forth herein is in accordance with the disclosure of the above-identified application of Parkinson.

The subscriber's station 550 is provided with similar apparatus including a receiver 552, transmitter 553, switchhook contacts 554, ringer 555 and induction coil 551, in addition, calling device 560 is provided which may be similar to calling device 520. As shown at station 550 a polar relay 556 is provided for switching from the telephone transmitting and receiving apparatus to the calling equipment and back. In addition, non-linear resistor devices 526 at station 510 and 566 at station 550 are provided to eliminate or greatly reduce clicks which may arise incident to the switching either at the subscriber's station or the central office. Additional subscribers' stations are shown on Fig. 6 such as 632, 634 and 636 as well as other undesignated subscribers' stations shown in Fig. 6.

It should be noted that the polar relay 556 is across the line in parallel with either the calling apparatus or in parallel with the voice frequency transmission and receiving apparatus and connects one or the other of these devices to the line and disconnects the other from the line. On the other hand relay 516 is in series with the talking apparatus when this apparatus is connected to the line but in parallel with the calling apparatus when this apparatus is in use. Relay 516 connects and disconnects the calling device 520 and the line but short-circuits or removes the short circuit from around the voice frequency transmission apparatus. Also when the voice frequency apparatus is in use the winding of relay 516, rectifier 518 and the retardation coil are shunted by condenser 519 and rectifiers 517. Of course other equivalent ways of connecting the windings of the switching relays and their contacts may be employed when desired.

While the calling equipment at the subscriber's station as well as the receiving equipment at the central office may be of any suitable type, the exemplary system described herein has been arranged to cooperate with the repetitive calling apparatus of the type disclosed in the above-identified application of Parkinson. Likewise while any suitable type of telephone switching system such as panel systems or cross bar systems, which systems are well known in the prior art, may be employed at the central switching station, the exemplary system embodying the present invention employs a switching arrangement of the type set forth in the above-identified application of Bruce and Hall.

As set forth in the above-identified application of Bruce and Hall and shown herein, the cross-bar switches employed to establish connections within and through the system have been divided into groups of primary switches, secondary switches, tertiary switches and register connector switches. Usually, a primary and secondary group of switches comprise ten levels or ten groups of primary switches and ten levels or ten groups of secondary line switches. Each primary level may include any number of switches. In the usual case one, two or three of the switches will have their horizontal rows or circuits connected together to form in effect one extended switch or switch level. Each switch on each level usually has ten horizontal rows which are connected together to form a circuit. The subscribers' lines terminate on the vertical columns or groups of contacts of the primary line switches. Each horizontal row from each of the primary switches connects to a vertical group of contacts in a different one of the ten different secondary switches. The horizontal rows of the secondary line switches are connected to trunks or circuits extending to the different junctor circuits. On terminating calls the secondary horizontal rows are connected to vertical columns on a group of tertiary cross-bar switches, the horizontal rows of which are likewise connected to the opposite ends of the junctor circuits. A group of cross-bar switches are also employed to connect the register circuits to the calling line to receive the calling information as will be described hereinafter.

Figs. 6, 7, 8, 9, 10, 11 and 12 show sufficient details of the switching system set forth in the above-identified application of Bruce and Hall to understand the manner in which it operates and cooperates with the other elements of the exemplary system set forth herein. Figs. 13, 14, 15 and 16 likewise show the details of certain portions of the disclosure of the above-identified application of Malthaner, Newby and Vaughan necessary to understand the manner in which this equipment operates and cooperates with the other portions of the exemplary system set forth herein.

When a subscriber 550, for example, is to initiate a call he will first set his calling device in accordance with the number or designation of the called station and then he will remove the handset from the cradle or lift the receiver from the switchhook which completes a direct-current circuit over the subscriber's line 565, which connects start ground to the upper terminal of resistor 638 and thus applies potential conditions to control gap of tube 613 which causes a discharge to be initiated across this gap and then the discharge transfers to the main gap but the current is limited through the hold magnet 612 by the resistances 627 so that the hold magnet 612 does not operate at this time. However, discharge current flowing through tube 613 changes the potentials applied to the start tube 618 so that a discharge is initiated through this tube whereupon a circuit is completed for the operation of relay 619. Relay 619 when operating applies the proper potential to the left-hand or cathode elements of tube 621 and 622 so that these tubes will be partially conditioned to have a discharge initiated through them.

Relay 619, when operated, through its right-hand operated contacts also completes a circuit for the operation of the start relay 1010 in the release and preference circuit. Relay 1010 in operating applies a positive voltage from the resistance voltage divider 1020 connected between batteries 1014 and 1024 to conductor 1011 which extends through normal or break contacts of relays of both of the register circuits 1150 and 1151. If either of these register or director circuits are idle or a circuit similar to them provided at the central office is idle, potential is extended through break contacts on some relay in a normal position, that is, relays 1152 of the register 1151 or relay 1153 of the register 1150. This circuit then extends over conductor 1170 through break contacts of the normal relays 715, 716, 815 and 816 of idle junctor circuits and through break contacts of the relays similar to relays 715, 716, 815 and 816 of other junctor circuits. From these break contacts the circuit extends over at least two other leads 827 and 727 and through break contacts of relay 661 to the break contacts of hold magnets such as 645 and 646 to the control anode of tubes 620 and 621 which are idle and which therefore are available for use. In this manner all of the possible switching paths from all of the idle junctors to the calling party's line are marked so that they are available for use in extending the subscriber's line to the register circuit.

Tubes 620, 621 and similar tubes in the control circuits 630, 639 and 637 associated with other primary cross-bar switches are connected in a lock-out circuit employing the lock-out register 626, lock-out common inductance 625 and battery 624. As a result only one of the tubes such as 620 or 621 will have a discharge fully initiated therein and transferred to the main circuit through the tube. Assume for purposes of illustration that a discharge is initiated through tube 621 and fully transferred to the main gap of this tube. Due to the action of the lock-out circuits the initiation and transfer of a similar discharge is prevented through any of the other tubes similar to this tube connected to the primary cross-bar switches. The lock-out circuit action is described in greater detail in United States Patent 2,350,888 granted to N. I. Hall, June 6, 1944.

Upon initiation of discharge through tube 621, a circuit is completed for operating the associated horizontal or select magnet 623 in series with a start relay 720 which is common to certain of the horizontal or select magnets of the primary switches.

Select magnet 623 is somewhat slow in operating but relay 720 operates very rapidly and applies the discharge initiating condition or voltage from the lower break contacts of relay 1012 to the control gap anodes of tube 710, 711 and similar tubes of other junctor circuits. These tubes are connected in the lock-out circuit comprising lock-out resistor 712, inductance 713 and battery 714. As a result only one of these tubes will have a discharge initiated through it and completely transferred to the main discharge path through the tube. For the purpose of this description assume that the discharge is initiated through tube 710 and fully transferred to the main discharge path through this tube. Upon the establishment of a discharge across the main discharge gap of tube 710 a circuit is completed for the operation of the select magnet 643 of the secondary cross-bar switch 640. Other select magnets may be also operated due to the discharge acros the main path of tube 710 but the operation of these other magnets is without significance under the conditions assumed herein; if other assumptions were made then the operation of the other magnets would be material to the establishment of the call.

The select magnet 643 is somewhat faster in operating than the select magnet 623, with the result that the select magnet 643 operates at about the same time or before select magnet 623 operates.

The operation of the select magnet 623 short-circuits resistor 627 and thereby increases the current flowing through tube 613 and the hold magnet 612 thus causing the operation of this magnet. The operation of hold magnet 612 together with the operation of the select magnet 623 closes the cross-bar contacts at the cross-points in the usual manner and in turn completes a circuit for maintaining the hold magnet 612 operated under control of the select magnet 623 independently of the discharge through the tube 613.

In addition the operation of the select magnet 623 of the primary switch completes a circuit for the operation of the hold magnet 646. The operation of the hold magnet 646 together with the previously described operation of the select magnet 643 causes the secondary switch contacts at cross-point to close and extend the communication circuit from the subscriber's station 550 over conductor 655 to the junctor circuit 730.

Upon the initiation of discharge through tube 621, in addition to completing a circuit of operation for select magnet 623 and relay 720 as described above, a circuit is also completed for operating relay 1013 at the same time. This circuit extends from positive voltage from voltage divider 1020 through the break contacts of relay 1017, the winding of relay 1013, the main discharge path of tube 621, the windings of the select magnet 623 and relay 720 to negative battery.

The operation of relay 1013 applies a positive voltage to the control gap anodes to tubes 1155 and 1157 and other similar tubes of other register circuits. These tubes are likewise arranged in the lock-out circuit including lock-out resistor 1158, lock-out inductance 1159 and battery 1160, with the result that a discharge is initiated through and transferred to the main gap of only one of these tubes associated with the register circuits. Assume for purposes of illustration that a discharge is initiated through tube 1155. Upon the initiation and transfer of discharge to the main control gap tube 1155 a circuit is completed for operating the select magnet 910 of the resistor connector cross-bar switch 911 of Fig. 9. The select magnet 910 operates at substantially the same time as the select magnet 643 or at least prior to the operation of the hold magnet 646. Upon the operation of the hold magnet 646 and the extension of the signaling path from the subscriber's station to the junctor circuit 730, an operating circuit is also completed to the hold magnet 912 thus causing the operation of this magnet.

The operation of the hold magnet 912 together with the previous operation of the select magnet 910 causes the cross-point contacts of the cross-bar switch to operate in the usual manner which extends the signaling path from the subscriber's station to the register circuit 1151. At this time the tip and ring conductors extend from the subscriber's station to the winding relay 1154.

Inasmuch as there is a direct current path or bridge between the tip and ring subscriber's line conductors at the subscriber's station through the winding of the polar relay 556, relay 1154 operates and completes a circuit for the operation of relay 1152. Relay 1152 connects ground to the sleeve conductor or S lead and thus maintains the hold magnets 612, 646 and 912 operated, which magnets in turn maintain the signaling circuit through the switches from subscriber's line to the register circuit 1151.

Figure 10:
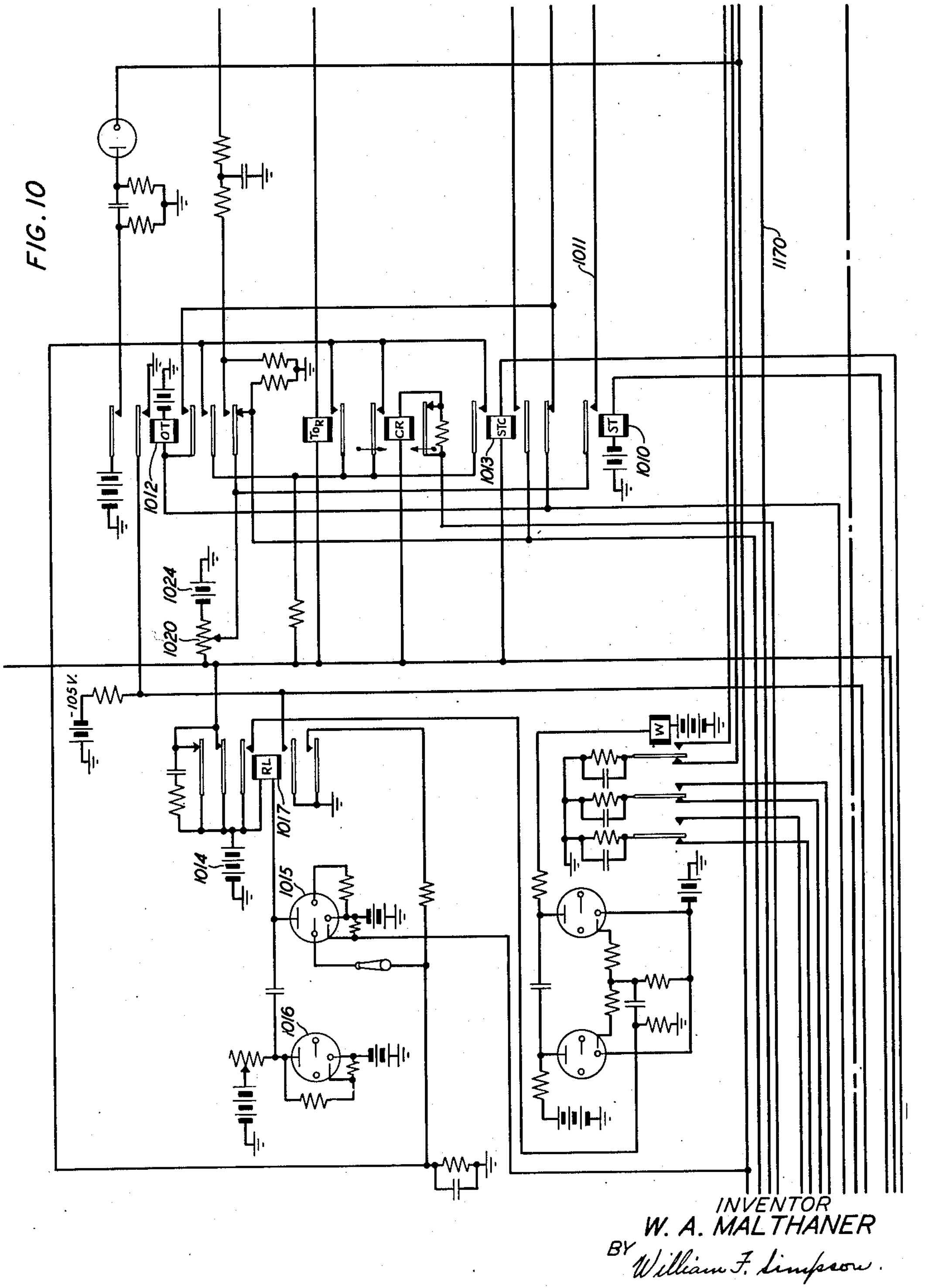

The operation of relay 1152 in addition applies a pulse through the diode 1161 and pulse forming network 1162 to the release and preference circuit shown in Fig. 10, which circuit thereupon operates in the manner described in the above-identified copending application of Bruce and Hall, forming a part of the present application. Briefly, the pulse from the diode tube 1161 is applied to an auxiliary gap of tube 1015, initiating discharge acros this gap which discharge transfers to the main gap of this tube and is maintained across the main gap for a predetermined interval of time as determined by tube 1016 and related circuits. The initiation of discharge across main gap of tube 1015 causes relay 1017 to operate and remove the operating potentials from the main gaps of the above-described tubes 621, 710 and 1155, as well as from all of the associated tubes. In this manner the discharges through the tubes above enumerated are interrupted and discharges prevented through all the other tubes until relay 1017 again releases. Negative battery 1024 is applied to various anodes of the above enumerated tubes to aid in the deionization of these tubes which materially reduces deionizing time so that discharges will not be falsely initiated through the tubes upon the subsequent release of relay 1017. Upon the release of relay 1017 the switching circuits at the central exchange are in condition for establishing other connections through the cross-bar switches, as described herein and in the above-identified application Bruce and Hall, Serial No. 782,704.

The above-described operation of relay 1154 connects ground to conductor 1110 extending to winding relay 1510 in the receiving circuit. In order to condition the receiving circuit to cooperate with the other circuits of the system, key 1614 and either key 1612 or 1613 will be operated. Application of ground to lead to 1110 causes the operation of 1510, which relay in operating removes the terminating resistor 1511 from the signaling circuit extending to the subscriber's station and establishes a signaling path from the input repeat coil 1310 to the band pass filter 1311. Operation of relay 1510 also removes ground from the upper terminal from condenser 1319 and thus conditions the limiting circuit shown in Fig. 13 to adjust the gain of the amplifier tubes 1314 and 1315 under control of received current or pulses. Operation of relay 1510 interrupts the operating and holding circuit of relay 1512, which relay then releases and removes the ground through its lower break contacts from lead 1410 extending to the code detector 1411 of the start circuit 1412, thus conditioning these circuits for the subsequent reception of pulses from the subscriber's signalling equipment 560.

It should be noted that negative battery is connected to the tip conductor through the upper winding of relay 1154 and ground is connected to the ring conductor through the lower winding of relay 1154. These connections cause current to pass through the winding of reay 556 at the subscriber's station 550 in the direction which causes the armature of relay 556 to move to or to be maintained in contact with its right-hand contact, thus connecting or maintaining the subscriber's dialing or signaling equipment 560 connected to the line 565, extending to the central station, and then through the above-described path through the switches to the register circuit 1151 and then to the receiver circuit shown in Figs. 13, 14, 15 and 16.

With the cradle or switch hook contacts 567 closed and relay 556 in the position shown, power is supplied to the driving motor 561 of the dialing equipment 560 from source 564, the dialing equipment 560 will be operated continuously to rapidly send pulses representing the called subscriber's station designation. The pulse transmitting equipment comprises a rotating member 561 carrying a plurality of magnets and one or more pickup coils represented by coil 563, Fig. 5. Any suitable type of calling equipment may be employed capable of continuously repeating pulses representing complete designation of the called subscriber's station. However, it is assumed that the calling equipment 560 is of the type described in the above-identified application of Parkinson, filed on the same date herewith.

Briefly, the calling equipment 560 is arranged to transmit two pulses representing each digital position of the subscriber's station designation. The magnitude of the digit in each digital position or the character of the alphabet or any other symbols in each such position, is represented by the time elapsing between the transmission of the two pulses. The pulses are frequently called a start pulse and a stop pulse. In an exemplary embodiment of the invention set forth herein these pulses are of a short duration and have a fundamental frequency within the voice frequency transmission range of the signaling path extending to the central office. These pulses are arranged to be transmitted over such signaling paths and thus preferably do not have any direct-current component. As set forth in exemplary embodiments in the above-identified applications of Parkinson and Malthaner et al., these pulses have a wave form which closely approximates a single cycle of a thousand cycle wave. This fundamental frequency is reasonably close to the mid-band frequency of the filter network 1311 and also to the mid-band frequency of many voice frequency communication channels.

In addition to sending two pulses for each of the digits or characters of a complete subscriber's designation, the signaling or calling equipment 560 also separates each group of pulses representing a complete subscriber's designation by a cause or blank interval which is appreciably longer than the longest interval which can occur between any two pulses representing the called station's designation and which in the exemplary embodiment of the invention described herein is approximately equal to the time assigned to the transmission of two characters or digits.

So long as the polar relay 556 remains in its right-hand position as shown in Fig. 5, the signaling equipment 560 continues to transmit pulses as described above, representing the designated calling subscriber's station, each series of pulses being separated by a blank interval having a duration longer than occurs between any other pulses representing the subscriber's station designation. These pulses are transmitted over the subscriber's line 565 to the central station and over the transmission path set up through the cross-bar switches, as described above, to the register circuit 1151 and the receiving circuit shown in Figs. 13, 14, 15 and 16.

Figure 13:
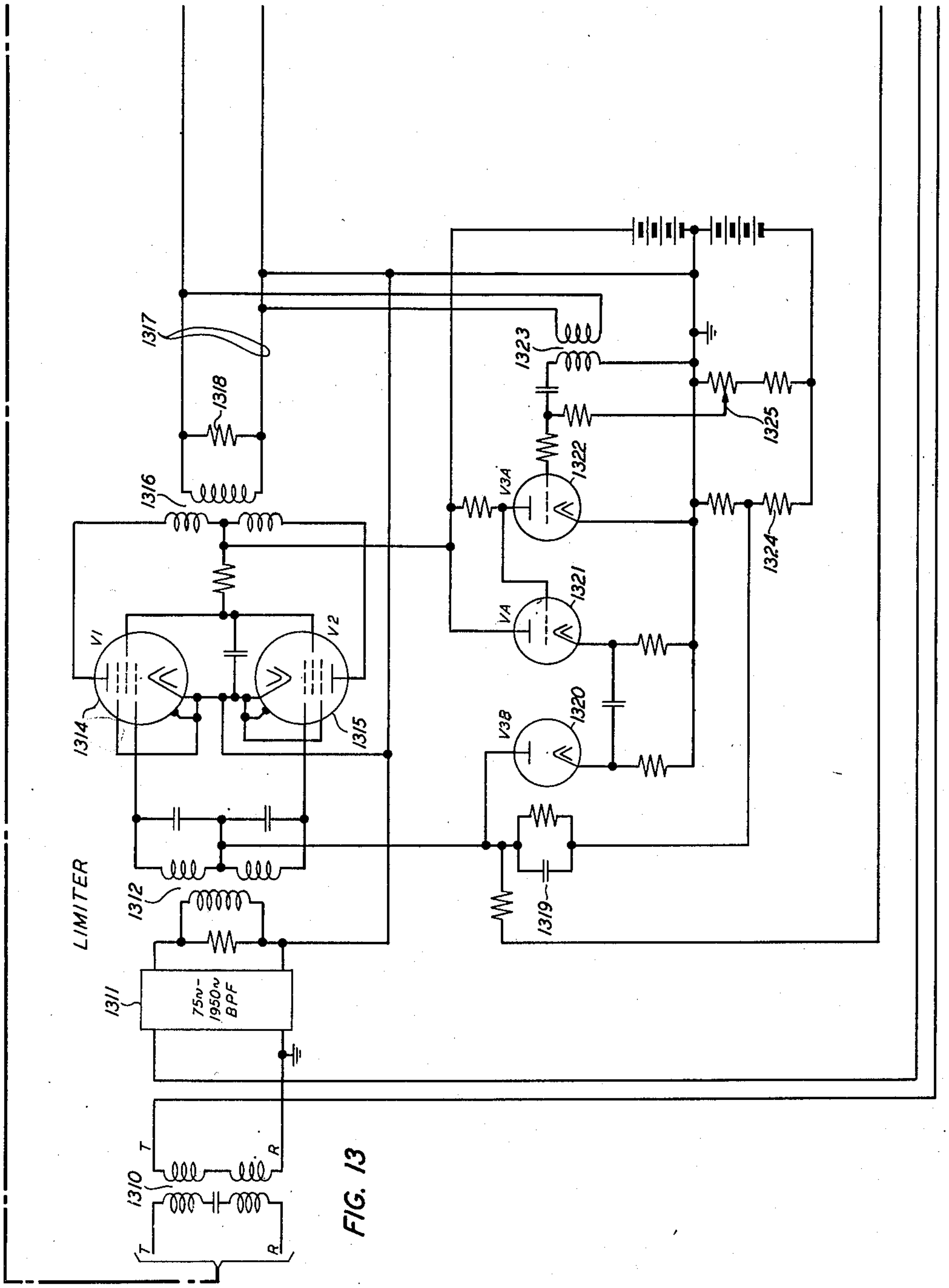
Figure 14:
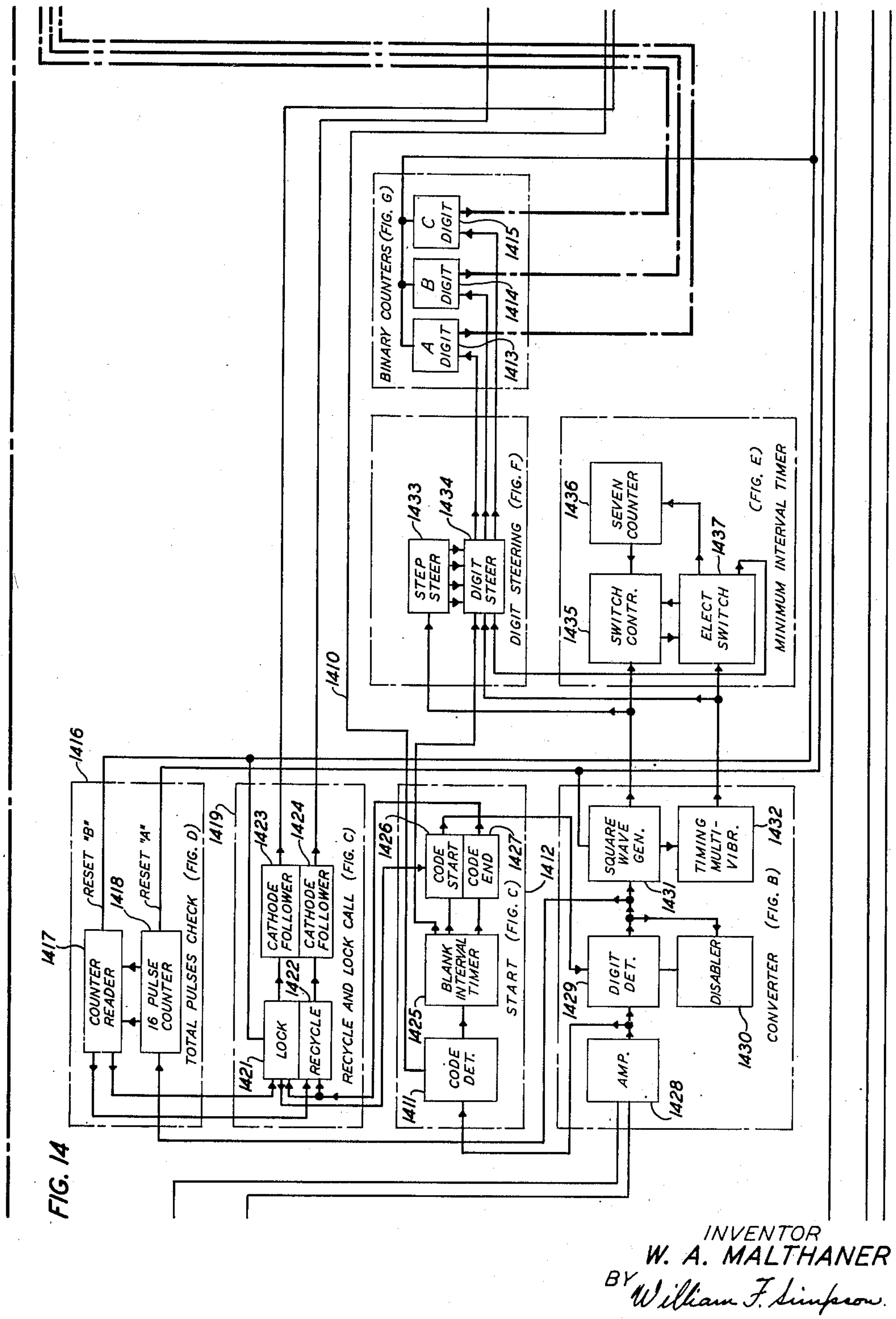

The pulses, as received by the receiving circuit, first cause the gain of the limiter shown in Fig. 13 to be set at the proper level as described in the above-identified application of Malthaner et al. In addition, these pulses after being repeated by the limiter circuit are transmitted to the code detector 1411 which detector is provided with a timing circuit which recognizes the blank interval between the series of pulses representing a complete designation. The other circuits are rendered ineffective and are blocked until such a blank interval is received. At this time the code detector 1411 as well as the other portions of the start circuit 1412 respond to the blank interval and cause the various other circuits to be conditioned to thereafter receive the pulses. These circuits then respond to the succeeding pulses received from the subscriber's station and cause the magnitudes represented by the various pulses to be stored on binary counters 1413, 1414 and 1415 as shown in Fig. 14. It is to be understood, of course, that any suitable number of such counters are provided, one being provided for each digit of the called subscriber's designation which is to be employed to control the switching equipment at the switching center.

The manner in which these pulses are received and recorded is described in detail in the above-identified application.

As set forth in the above-identified application of Parkinson and the above-identified application of Malthaner et al., when pulses of short duration of the type described above are transmitted over voice frequency communication paths and through the various types of equipment of associated paths such as repeat coils, amplifiers, condensers, filters and the like, the pulses cause transient currents to effectively prolong the pulses as received. In addition, it may be desirable to operate the motor such as 561 at the subscriber station 550 by power received over the subscriber's line, in which case it is desirable to separate the power currents for operating the motor from the signaling currents generated by the calling equipment 560. Due to the above factors and also in an effort to reduce the effects of noise and extraneous currents, a band-pass filter 1311 is provided. This filter likewise tends to have transients set up in it due to the application of signaling pulses to it. As a result, a signaling pulse which is about a thousandth of a second in duration as transmitted is extended or lengthened to about 3 or 3½ thousandths of a second by the above-described effects. Consequently, pulses must be spaced further apart than this time interval. This minimum time interval, together with the length of the pulses and the information to be conveyed by the pulses as set forth in the above-identified application of Malthaner et al. and Parkinson, requires about 12½ milliseconds for the transmission of each digit in an exemplary system such as set forth herein and in said copending applications. In order to more clearly describe the operation of the system, it has been assumed that each interval that has been assigned to a digital position, has been divided up into 25 increments, each increment being slightly less than a half millisecond. Thus, each received pulse persists for approximately 7 increments, not including the one in which the pulse starts or is transmitted. In order to recognize the pulses more accurately and to distinguish them from noise and also to render the system less subject to noise interference, provision has been made to block the receiving equipment for approximately 7 increments of time following the reception of each pulse.

As set forth above, pulses are received and amplified by the amplifier circuit of Fig. 13. The gain of this amplifier circuit is automatically regulated so that the amplitude of the pulses from this amplifier are substantially independent of the amplitude of the pulses as received. The pulses are then further amplified by amplifier 1428, then supplied to the code detector 1411 and digit detector 1429. As described above, the code detector, together with the blank interval timer 1425, recognizes the blank intervals between each complete series of pulses representing the entire subscriber station designation. The digit detector 1429 is normally rendered inoperative. However, in response to the operation of the blank interval timer which in turn operates the code start circuit 1426, the digit detector 1429 is rendered operative so that it will respond to the succeeding pulses received from the calling device 560 from subscriber station 550. The first start pulse thereafter is received by the digit detector 1429 which pulse is employed to control the square wave generator or switching device 1431 and in turn to start a timing circuit such as multivibrator 1432 into operation. The switching circuit 1431 also causes the steering and stepping circuit 1433 to condition the digit steering circuit 1434 so that when pulses are applied to it, as will be described hereinafter, they will be directed to the first digit counting and storing circuit 1413.

In response to the first start pulse applied to the digit detector, the disabling circuit 1430 is actuated which in turn renders the digit detector unresponsive to any further received currents for the interval of time required for the transients to die out or approximately seven additional increments of time. At the end of this time the digit detector circuit 1429 is again rendered operative so that it will properly respond to the stop pulse. Meantime, however, the multivibrator or timing circuit 1432 has been arranged to transmit or generate seven cycles or 7 pulses, which pulses or currents are applied to the selective switching circuit 1437. The selective switching circuit 1437 was set by the output of the square wave generator 1431 and switching controlling circuit 1435 in response to the first start pulse as described above so that the selective switching circuit 1431 causes the first pulses received thereby to be transmitted to the counting circuit 1436. The counting circuit 1436, counts 7 of these pulses, that is, the pulses received during the time the transients are dying out and the end of the seventh pulse actuates the switching control of 1435 so that the switch 1437 is actuated to its position or condition where it causes the remaining pulses received from a source 1432 to be transmitted through the digit steering circuit 1434 instead of to the counting circuit 1436. Each succeeding pulse or cycle from the source 1432 is then transmitted through the digit steering circuit 1434 to binary counter circuit 1413 which circuit then counts each of the succeeding oscillations or pulses from the timing circuit 1432.

If the first digit has the magnitude of one, the timing multivibrator 1432 will have time to transmit only one pulse to the counting and steering circuit 1431 before the stop pulse will be received. If the magnitude of the first digit is 5, for example, then 5 pulses will have been transmitted to circuit 1413 before the stop pulse is received. Thus, the time of reception of the stop pulse relative to the start pulse is employed to designate the magnitudes of the digits or character of the designation of the called station code. The reception of the stop pulse operates the digit detector 1429 and the square wave generator 1431 to stop the operation of circuit 1432. The stop pulse also causes the digital detector 1429 to be disabled for 7 increments of time during which the transients associated with the stop pulse can die out.

The next start pulse will then cause the circuits to operate in a manner similar to that described above in reference to the first start pulse except that the stepping circuit 1433 will advance the digit steering circuit 1434 and cause the succeeding pulses over and above the first 7 from the source 1432 to be transmitted to and recorded by the counting circuit 1414. In a similar manner the magnitude of each of the succeeding digits is recorded by the succeeding counters 1413, 1414 and 1415, etc. As many counting circuits will be provided at each switching station as may be necessary to properly control switches at these stations. The pulses representing the magnitude of the respective digits are selectively directed by the stepping and steering circuits 1433 and 1434 and transmitted to the respective digit storing circuits. It will also be understood that in case it is necessary to determine the magnitude of all of the digits, as for example, eight in the specific exemplary embodiment set forth herein, eight counting circuits similar to 1413, 1414, and 1415 will be provided together with suitable control and steering circuits.

As shown in the drawing, the three counting circuits 1413, 1414, and 1415 are employed to record the magnitude of the digits in the first three digital positions of a complete subscriber's designation. It is obvious that one such counter will be necessary for each digital magnitude of which is necessary to determine. Thus, if it is necessary to determine the magnitude of the first four digits, an additional counter will be employed and connected to the steering circuit.

When it is necessary to determine the magnitude of only a portion of the final digits of the subscriber's designation then the counters connected to the first stages of the steering circuits may be omitted and counters provided for and connected to the portion of the steering circuit associated with the final digits of the complete subscriber's designation. In case it is desired to determine the magnitude of certain of the intermediate digits of the subscriber's number, counters will be associated with the steering circuit tubes or relays rendered active at the time pulses representing these intermediate digits are received. In this case counters associated with the first stages may be likewise omitted and the counting and steering stages associated with the final digits may also be omitted.

Checking provisions have also been provided for checking the operation of the circuits to insure that the proper number of pulses have been received. As pointed out above, two pulses are required to represent each digit. If the complete subscriber's designation comprises 8 digits, then 16 pulses should be included in each series pulses between the blank intervals. The output of the digit detector 1429 is applied to a 16 pulse counting circuit 1418. If more or less than 16 pulses are received by the counting circuit 1418 between two blank intervals, the circuits are arranged to cancel all registrations and start over in response to the next series of pulses.

In order to accomplish this, the 16 pulse counter 1419 controls the counter reader 1417. If the counter 1418 has counted other than 16 pulses, the counter reader 1417 conditions the recycle circuit 1422 so that it will repeat a pulse from the code end circuit 1427 in response to the next blank interval through circuit 1424 and cause the operation of relays 1513 and 1514. These relays operate to record on register 1515 the number of times the system has to be recycled and also removes a short circuit from around inductances 1551 and 1552 in the battery supply to the various counter and switching circuits as described in the above-identified application Malthaner et al. so that these circuits are all restored and set to their initial condition at which time they again respond to the succeeding series of pulses transmitted from the calling device 560.

If a total of 16 pulses, in the exemplary embodiment of this invention set forth herein, is received between the two blank intervals, then the counter reader 1417 will condition the locking circuit 1421, instead of the recycle circuit 1422, to repeat a pulse from the code end circuit 1427 in response to the succeeding blank interval. The locking circuit 1421 then functions through the circuit 1423 to operate relay 1516, thus indicating that the proper number of pulses have been received.

The operation of relay 1516 interrupts the operating circuit of relay 1510, thus permitting relay 1510 to release. The release of relay 1510 reconnects terminating resistance 1511 to the incoming line from the repeat coil 1310. Release of relay 1510 again grounds the upper terminal of 1319, thus restoring the gain of the regulated amplifier, shown in Fig. 13, to its maximum value. The release of relay 1510 also completes a circuit for the operation of relay 1512, which relay in turn operates and connects ground to lead 1410, which in turn renders the code detector 1411 unresponsive to further receiving signal currents.

The operation of relay 1516 completes an obvious circuit for the operation of relay 1518. Relay 1518, when operated, removes a short circuit from around inductance 1551 which causes the square wave generator or switching circuit 1431 and the 16-pulse counter 1418 to be reset to their initial or normal condition.

The operation of relay 1516 also connects positive battery to the anodes of tubes 1520, 1521, 1522, 1523, 1624 and 1625. Both sections of these tubes operate as cathode followers and transfer the setting of the binary counters 1413, 1414 and 1415 to the relays 1531 to 1538 and 1630 through 1633, inclusive. Tubes 1520 and 1521 transfer the condition of the counter 1413 to relays 1531 through 1534, similarly tubes 1522, 1523 cause relays 1535 through 1538 to be operated in accordance with the condition of counting circuit 1414. Likewise tubes 1624 and 1625 cause relays 1630 through 1633 to be operated under control of the condition or setting of counter 1415. If the call in question is a test call, it is possible to set the corresponding switches 1541 through 1548, and 1641 through 1644 in accordance with the code of the test call. Then the lamps controlled by the keys, as well as the lamps controlled by the above-identified relays, will be correspondingly lighted or out if the code is properly received. If the call is not a test call no means are provided for checking the operation of the receiving equipment other than the 16-pulse counter described above.

The operation of relay 1516, in addition, connects ground over conductor 1111 and through the left-hand break contacts relay 1167 to battery through winding relay 1169. Relay 1169, operated, completes a circuit for the operation of relays 1012 and 661, providing 1013 is released. Relay 1013 will be released unless the control equipment is in the process of establishing a connection through the switching equipment as described above from a subscriber's line to an idle junctor and register circuit. If relay 1013 is operated at this time the circuits above described will remain in the condition described until relay 1013 releases upon the completion of the establishment of the connection then being made through the switches. Thereafter relays 1012 and 661 will operate and relay 1012 will complete a circuit for maintaining itself and relay 661 operated under control of relay 1169. Relay 1012, operated, initiates the operation of the time out circuits and conditions the control circuits for establishing a transmission path from a junctor circuit to a called line under control of a register circuit as will now be described. Relay 1012, operated, first causes the release circuit of Fig. 10 to operate and interrupt any discharges through tubes of the control circuits which may have been initiated during the operating time of relay 1012. The operation of relay 1012 also prevents the control circuits from responding to any incoming calls until a circuit has been established to the called line, as will be described.

The operation of relay 1169, together with the operation of relay 1012, applies positive voltage from voltage divider 1020 to control gap anode of tube 1163. Tube 1163, together with tube 1164 and similar tubes in other registers not shown are all connected in a lock-out circuit including resistance 1173 and inductance 1174, so that a discharge may be initiated and fully transferred to the main discharge path within only one of these tubes. Assume for purposes of illustration that discharge is initiated through and transferred to the main discharge path of 1163 at this time.

Figure 12:
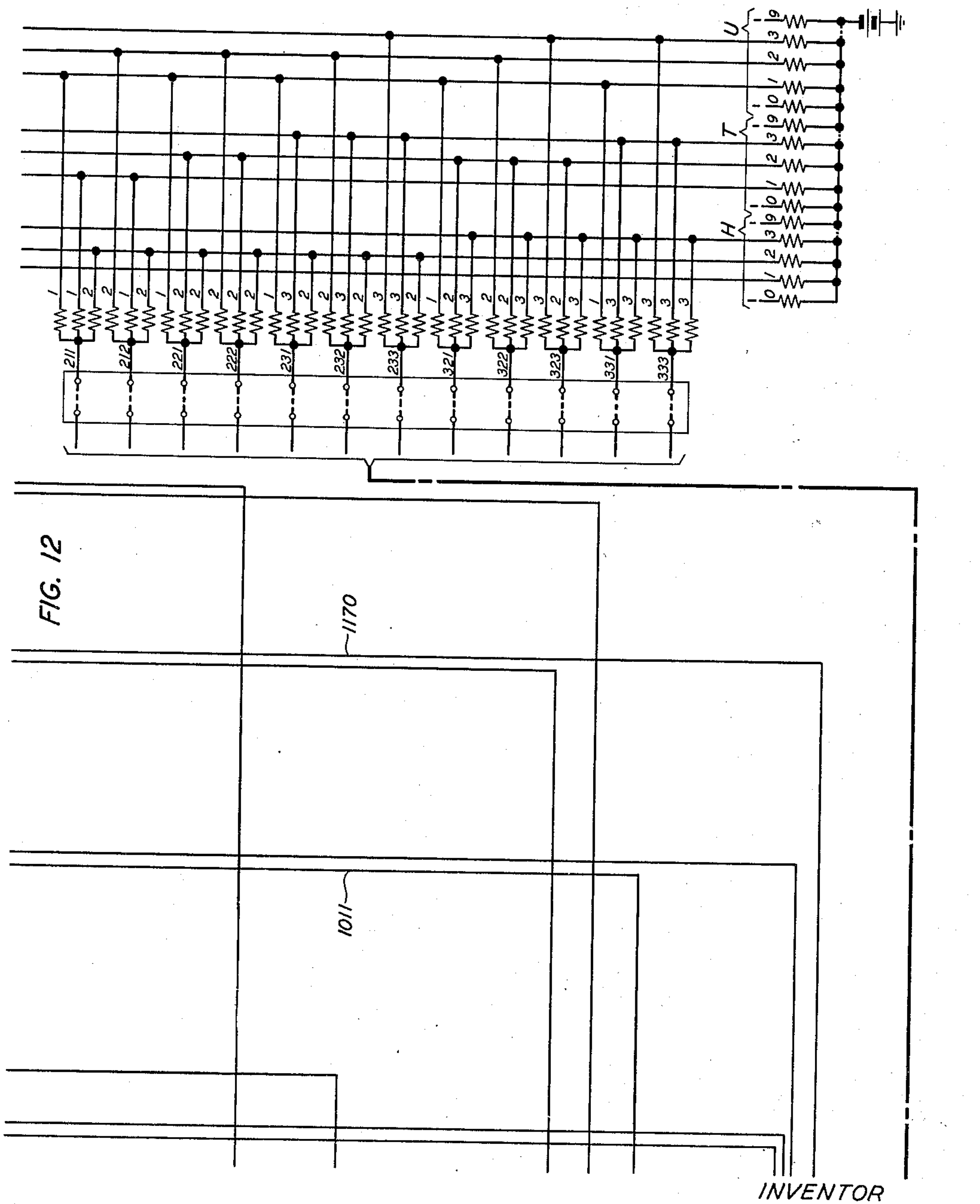

Upon the transfer of the discharge to the main discharge path through tube 1163, relay 1165 operates and connects ground to lead 1115; connects the conductors from the register circuit to the number group circuit shown in Fig. 12; completes a circuit for maintaining relay 1169 operated and completes a circuit for the operation of relay 1167.

When ground is applied to lead 1115 which extends through the register connector switch to the junctor circuit 730, a circuit is completed for the operation of relays 718, 722 and 917, and the tertiary select magnet 915. Relay 718 in operating, transfers the tip and ring conductors from the register circuit to the windings of relay 719, thereby causing the operation of relay 719, and relay 719 in operating, connects ground to the S conductor and maintains the hold magnets 612 and 646 operated. Relay 718, in operating, completes a circuit through both windings of relay 717, but since the current flowing through these windings produces opposite magnetic effects upon relay, the relay does not operate at this time.

When the tip and ring conductors are transferred from the register circuit to the windings of relay 719 the polarity of the potential and direction of current over the calling subscriber's line is reversed. The polar relay 556 at the subscriber's station responds to this reversal and disconnects motor 561 from source of power 564, disconnects the calling device 560 from the line 565 and connects the talking equipment to the line for transmission and reception of talking currents.

When the tip and ring conductors are transferred from the register circuit to the windings 719, the operating circuit of relay 1154 in register circuit of 1150 is interrupted, thus permitting this relay to release. Relay 1154, in releasing, causes relay 1152 to release and also removes ground from lead 1110. The release of relay 1152 removes ground from the S conductor at the register circuit. Thus the release of relays 1154 and 1152 partially restores the circuits to their normal or idle condition.

Relay 917 operates in series with the select magnets such as 915 and 916 and the other select magnets of the tertiary switch 930. Upon the operation of the select magnet 915 as described above and the operation of relay 917, positive voltage from the voltage divider 1020 is applied through resistor 918 and through the operated contacts of relay 917 to the break contacts of all of the hold magnets of the tertiary cross-bar switch 930 to mark all of the idle paths leading to this cross-bar switch. The circuits thus marked by this voltage extend through the normal break contacts of the unoperated hold magnets which complete circuits extending over the SEL leads to the select magnets of the associated secondary cross-bar switches. For example, a circuit extends through the break contacts of the hold magnet 930 and through the first select magnets of switches 647 and 670 and other similar magnets of similar switches not shown in the drawing. Likewise, a circuit extends to the break contacts of the hold magnet 919, when this magnet is released, through the select magnet 641 and the corresponding select magnet associated with a group of select magnets 680 and other select magnets associated with other switches not shown, and then through the operated contacts of relay 661 and then through the break contacts of the idle hold magnets of the corresponding secondary cross-bar switches. From these contacts a circuit then extends through the associated primary select levels to control anodes of tubes 620, 621 and the corresponding tubes of the other primary switches associated with idle paths which may be employed to establish a connection from the called subscriber's line to the junctor circuit 730.

Figure 11:
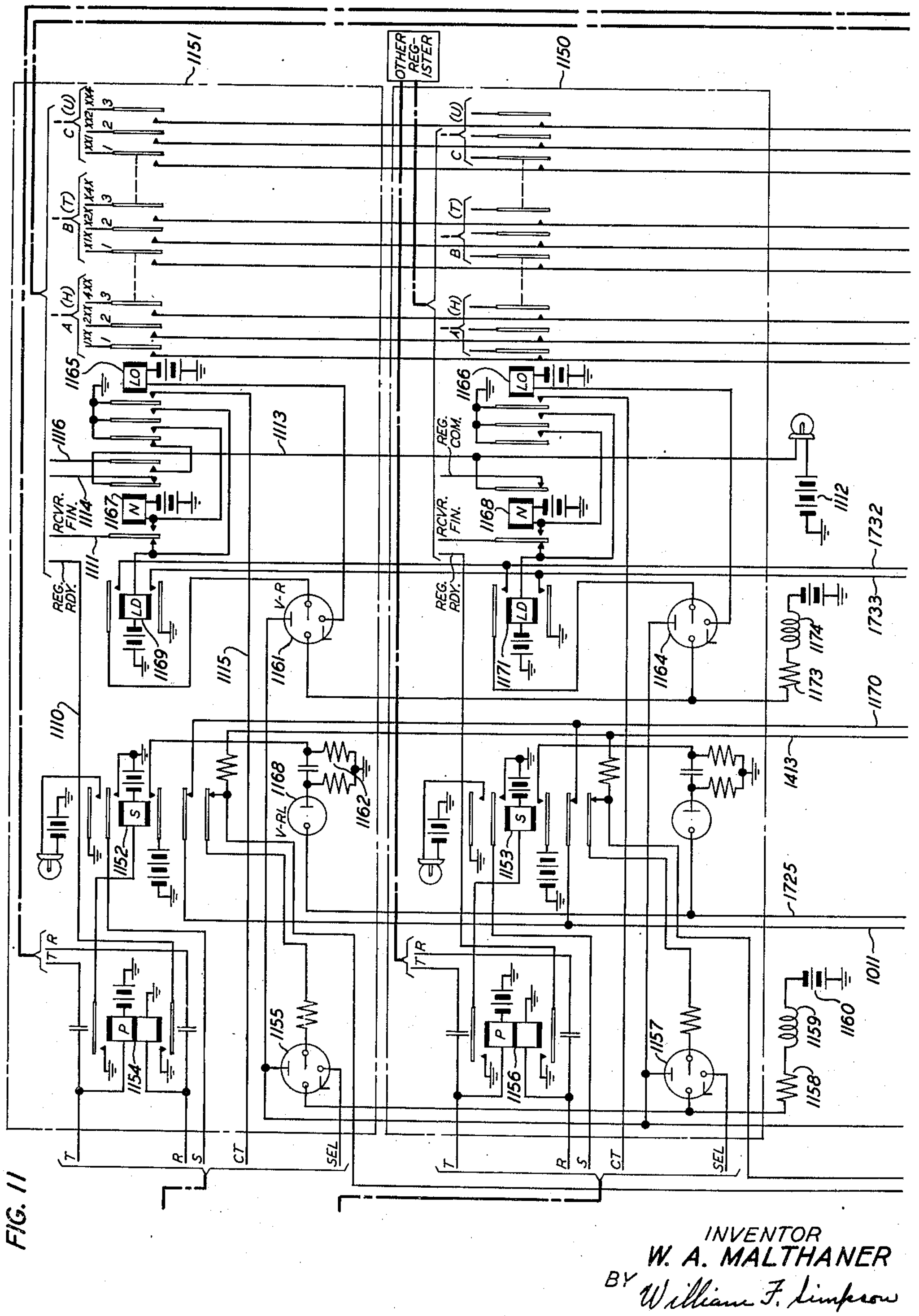
Figure 15:
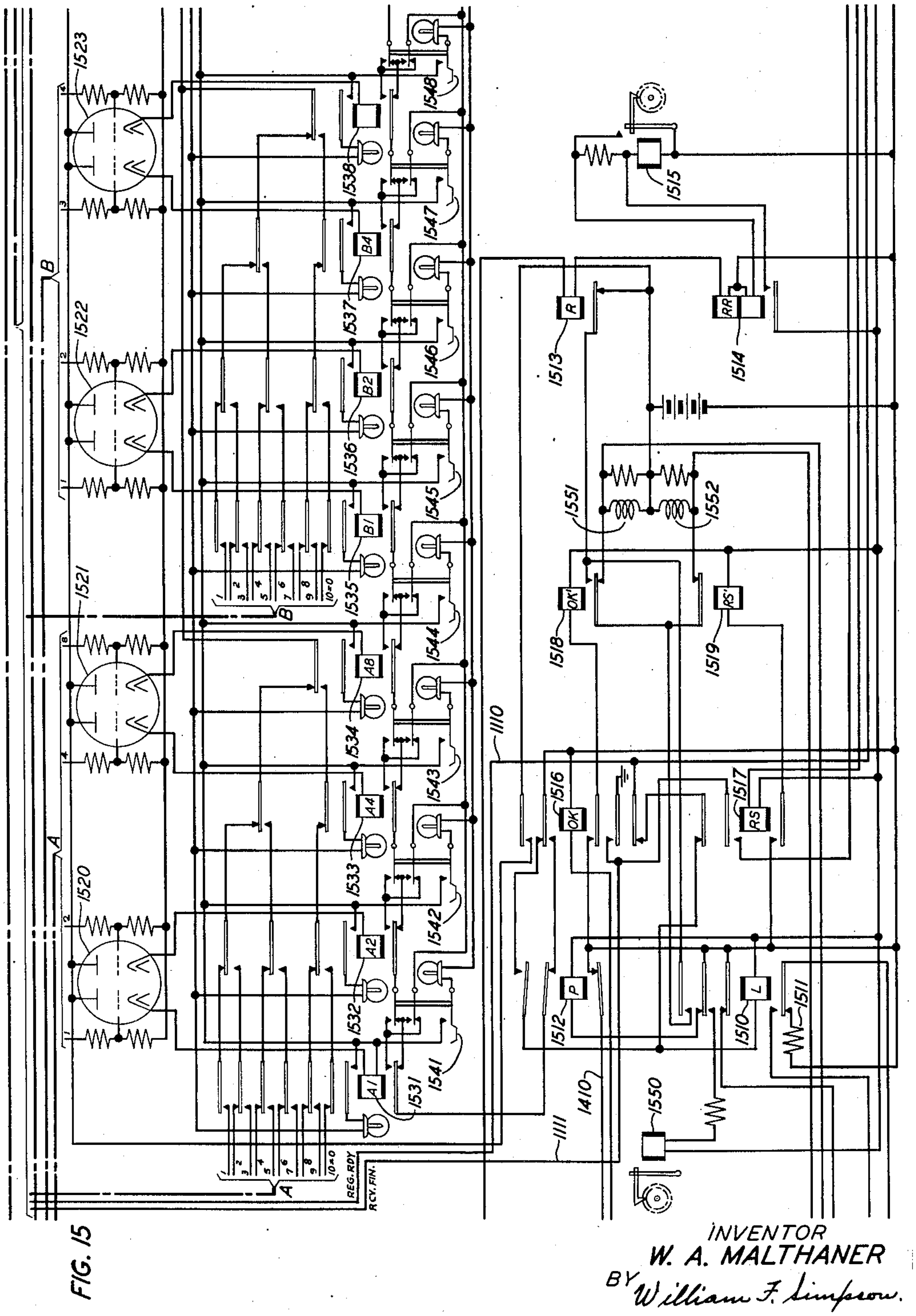

Upon the connection of the leads from the register to the number group circuit by the operation of relay 1165 the first four relays 1531 through 1534, which were set by counter 1413, in response to the magnitude of one digit assumed to be the first digit of the called subscriber's number, apply positive voltage from battery 1112, conductor 1113 and break contacts of relay 1167, conductor 1114, the upper contacts of relays 1531 through 1534 to one of the thousands leads designated A in Figs. 15 and 11. Similarly, the second set of four relays 1535 to 1538, connect positive potential from the same battery to one of the hundreds leads designated B in Figs. 11 and 15. Relays 1630 through 1633 which are controlled by the units digit similarly connect positive voltage from the same battery to one of the ten leads designated C.

With positive battery connected to one of the thousands, one of the hundreds, and one of the units leads, one of the terminals on the left in the number group circuit will have a positive voltage substantially equal to the positive voltage of battery 1112 connected to it. All the other terminals will have a much lower voltage applied to them. The voltage of this one lead, which is assumed to be lead 211, extending to tube 616 is of sufficient magnitude to initiate a discharge through the auxiliary gap of tube 616 if the called line is idle. If the called line is busy the main cathode of tube 616 will be at ground potential instead of at a negative voltage with the result that the voltage applied to lead 211 is insufficient to initiate a discharge across the auxiliary gap. As a result the circuits remain in the above condition until the control circuits are released by the time-out circuits operating the release circuits. During this time and until the calling subscriber hangs up busy tone or signals are transmitted to the calling subscriber and through his receiving device 552.

Assume now that the called line 525 is idle and a discharge initiated through tube 616, which discharge is immediately transferred to the main discharge path through the tube, and in turn causes a discharge to be initiated through tube 618. Tube 618, in becoming conducting, causes relay 619 to be operated. Relay 619 in turn applies negative voltage to the control gap cathodes of tube 620, 621 and similar tubes associated with the vertical select magnets of the primary cross-bar switch 610, thus preparing these tubes for initiation of discharge through them since a sufficient positive voltage is applied to their control anodes in the circuits described hereinbefore.

Relay 1167 in operating interrupts the original operating circuit of relay 1169, completes a circuit for maintaining itself operated under control of relay 1516, and interrupts the battery supply through the contacts of relays 1531 through 1538 and 1630 through 1633 to the number group circuit of Fig. 12. Tubes 620, 621, and the other tubes individual to the other primary select magnets are connected in a lock-out circuit arrangement as described above such that only one of these tubes at a time may have a discharge initiated through it and fully transferred to the main discharge path through the tube. Assume for purpose of illustration that tube 620 is the tube in which the discharge is initiated at this time. Upon the initiation then of a discharge across the main discharge path as in the tube 620, a circuit is completed for the operation of the select magnet 622, relay 820 and relay 1013.

The operation of relay 820 at this time connects ground to a group of select magnets of secondary switches including the select magnet within the rectangle 647, thus operating the magnet within this rectangle which corresponds to select magnet 641 and switch 640. The select magnet 622 is somewhat slow in operating and does not operate until relay 840 and the select magnet corresponding to 641 of the group 647 have operated. Then upon the operation of the select magnet 622, resistor 627 is short-circuited and the hold magnet within rectangle 614 operated which closes the corresponding cross-points between the subscriber's line 525 and the circuit path 652. Closure of these cross-bar contacts causes the hold magnet corresponding to hold magnet 646 but associated with contacts 649 to close and extend the switching path 652 to path 657 because the first select magnet of the group 647 was previously operated as described above. Upon closing these cross-point contacts and extending the subscriber's line circuit to conductors 657, a circuit is also complete for the operation of the hold magnet 930. The hold magnet 930 operating at this time, with the select magnet 915 operated as described above, closes the corresponding cross-point contacts and extends subscriber's line 525 to the tip and ring conductors of the right-hand end of the junctor circuit 730. The closure of the cross-bar contacts due to the operation of the select magnet 915 and the hold magnet 930 completes the circuit for the operation of relay 724 if the called line is idle and also applies a potential to the pulse forming the network 725 which pulse is transmitted through the diode 726 to the release circuit to gas tube 1015 which tube causes the release circuit to function by operating relay 1017 which relay in turn removes the positive anode potential from all of the control tubes and in turn releases the various select magnets which have previously been operated. Upon the extinguishing of the discharges through the tubes and the release of the various magnets, the timing circuit, employing tube 1016, functions and restores the release circuit to its initial condition wherein the circuits are ready to control establishment of another connection.

Upon the operation of release circuit as described above, the discharge through tube 1163 is interrupted and relay 1165 released. The release of relay 1165 disconnects the conductors from relays 1531 to 1538 and 1630 to 1633 from the number group circuit shown in Fig. 12. Release of relay 1165 also releases relay 1169.

Release of relay 1165 removes ground from lead 1115 extending to the junctor circuit and then to the lower winding of relay 717 through the upper inner operated contacts of relay 718. Relay 717 thereupon operates due to the current flowing through its upper winding and removes ground from the S conductor extending to and through the register connector thus releasing the operated hold magnet, 912, which in turn releases the cross-bar switch contacts between the junctor and the register circuit.

Figure 16:
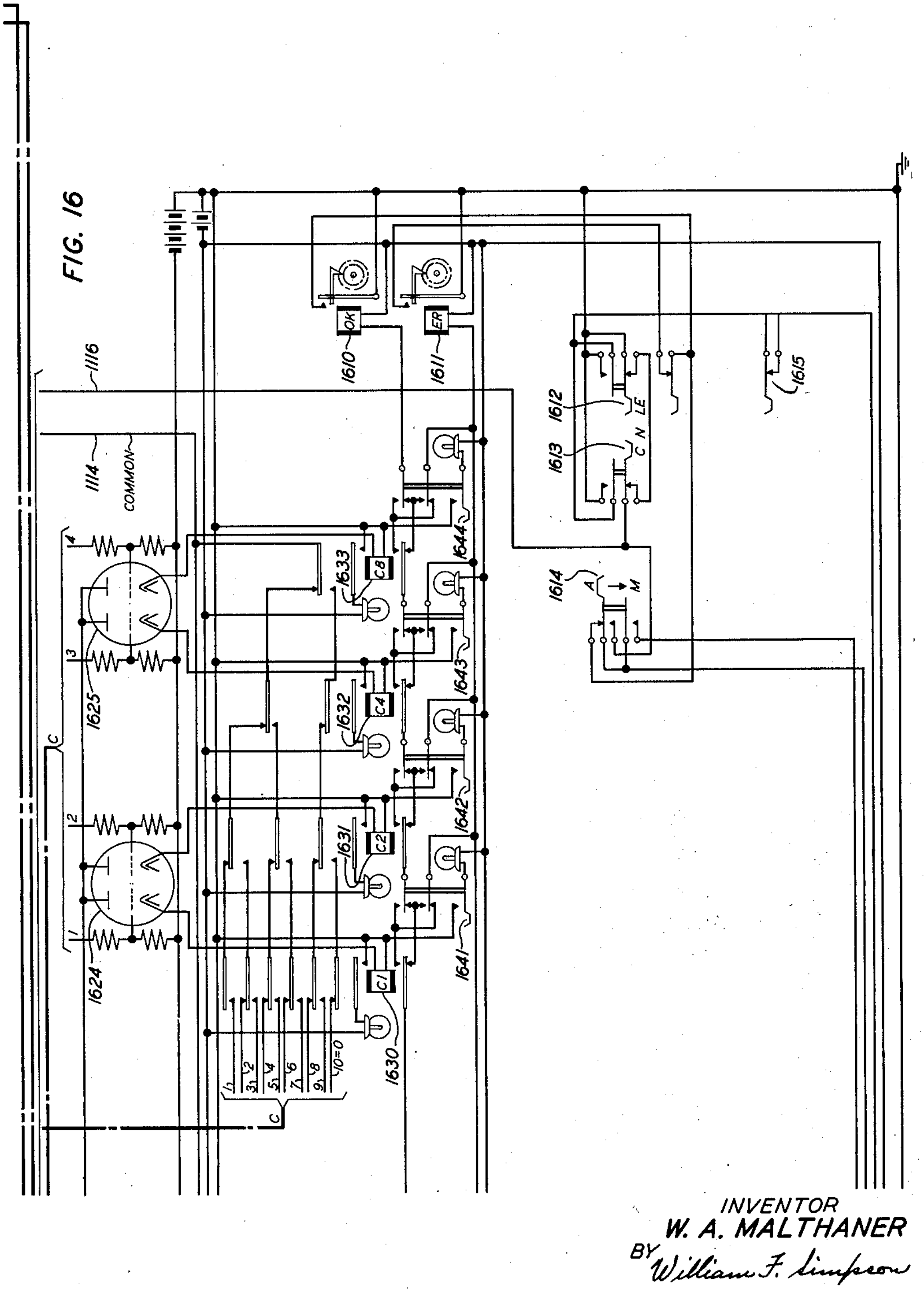

Release of relay 1165 at this time, with relay 1167 locked operated under control of relay 1516, completes a circuit for the operation of relay 1517 from ground through the break contacts of relay 1165, the operated contacts of relay 1167 and over conductor 1116 which extends to receiving circuit shown in Figs. 15 and 16 and then through the operated contacts of key 1614 and the winding of relay 1517 to battery. It should be pointed out that key 1614 is operated during normal operation of the system to cut out registers 1610 and 1611 in case such registers are provided for registering the response of the system to test calls. In addition, key 1615 and either key 1612 or 1613 should also be operated to prevent improper operation of relays 1510 and 1517. Relay 1517 in operating completes a circuit through key 1614 maintaining itself operated under control of relay 1516.

Relay 1517 in operating also completes an obvious circuit for the operation of relay 1519. Relay 1519 operates and removes a short circuit from the inductance coil 1552 which causes the binary counters 1413, 1414, and 1415 and such other similar counters as may be provided, a locking circuit 1421, recycling circuit 1422, and counter reader circuit 1417 to be restored to their idle or initial condition.

When the locking circuit 1421 is restored to its idle or initial condition it interrupts current flowing through the winding relay 1516 and thus permits relay 1516 to release. Release of relay 1516 removes the anode battery for the cathode follower tubes 1520, 1521, 1522, 1523, 1624, and 1625. Removal of this battery together with the resetting of the counting circuits 1413, 1414, and 1415 causes the storage relays 1531 through 1538 and 1630 through 1633 to be restored to their idle condition. Release of relay 1516 also interrupts the circuit of relay 1518 thus permitting this relay to release.

The release of relay 1516 also interrupts the locking circuit of relay 1167 from ground through the lower operated contacts of relay 1516 and over the lead 1111 to battery through the winding and front left-hand contacts of relay 1167. The release of relay 1167 restores the register circuit 1151 to its normal or idle condition.

Release of relay 1167 in turn interrupts the operating circuit of relay 1517, described above, so that relay 1517 releases and in turn releases relay 1519 thus restoring the receiving and storage circuits shown in Figs. 13, 14, 15 and 16 to their normal or idle condition.

Under the assumed conditions of the subscriber's line being idle, establishment of the communication path to subscriber's line 525 extending to the subscriber's line 510 causes ringing current through the operated contacts of relays 722 and 724 to be applied to the subscriber's line and ring the subscriber's bell 515. When the subscriber answers by removing his talking instrument from its supporting member the tip and ring are connected together by a low impedance path through the primary winding of induction coil 511, transmitter 513, and rectifiers 517. Sufficient current flows over the line 525 and the above path and through the ringing trip relay 723 to operate that relay and release relay 722, whereupon the windings of relay 721 are connected to the called subscriber's line. It should be noted that ground is connected to the tip conductor through the upper winding of relay 721 and that negative battery is connected through the lower winding of relay 721 to the ring conductor extending to the called subscriber's line at this time. These potentials are in such a direction that rectifiers 518 oppose the flow of current through them and the winding of relay 516, thus preventing the operation of relay 516. Instead the current flows through rectifiers 517 and then through the transmitter 513 furnishing talking battery to the subscriber's transmitting equipment. Thus the potential applied to the line is in such a direction that the talking equipment remains connected to the line and the subscriber's calling equipment 525 remains disconnected from the line.

Relays 721 and 719 thus operate and remain operated during the remainder of the call between the two subscriber stations. Both these relays, in remaining operated. connect ground to the sleeve or S lead and maintain the hold magnets operated.

At the termination of the call, when both subscribers hang up, both relays release and permit the release of the various hold magnets which restore the circuits to their initial or idle condition, wherein they are in condition for use in establishing other calls between the same or other subscriber stations.

From the foregoing description of an exemplary system embodying this invention when read with reference to the attached drawings, it is evident that the subscribers are provided with calling devices which, after having been first set by the talking subscriber in accordance with the called subscriber's number and then set into operation by the placing of a call, repeatedly transmit the number of the called station to the central office. The central office switching equipment is arranged to respond to one or more of the complete sets of pulses or currents representing the called subscriber's station or station designations. Means are also provided under control of the central office for connecting the calling device to the line extending to the central office switching apparatus upon the placing of a call and disconnecting it from the line and connecting the usual telephone transmission and supervisory apparatus connected to the line shortly after the called line or called path has been finally selected. The calling device is also disconnected and maintained disconnected from the line and the telephone transmission and supervisory apparatus is connected to the line under control of the central office when the subscriber answers a call incoming to this station or instrument.

What is claimed is:

1. In combination, a telephone switching system comprising a subscriber's station, a central switching station, a telephone subscriber's calling device located at the subscriber's station including apparatus for repeatedly transmitting calling currents representing a called station designation over and over, switching means at the subscriber's station controlled by currents transmitted from the central switching station for connecting and disconnecting said calling device to said subscriber's line.

2. A telephone switching system comprising a calling line, a switching station connected thereto, a calling device for transmitting signaling currents representing a called subscriber's station designation, means operated by one current condition transmitted over said calling line to connect said calling device to said line, and apparatus responsive to another current condition transmitted over said line for disconnecting said calling device from said line.

3. In combination in a telephone switching system, a subscriber's station, a calling signal transmitting device located thereat, telephone transmission equipment also located thereat, a switching device responsive to one polarity of current received over said line for connecting said calling device to said line, equipment responsive to another polarity of said current for disconnecting said calling device from said line.

4. In combination, a telephone switching system, a central station comprising control apparatus, a subscriber's station comprising a calling signal transmitting device and telephone transmitting and telephone receiving equipment and switching apparatus, a line extending between said stations, means at said central station under control of said control apparatus responsive to initiation of a call to apply one polarity of current to said line to actuate said switching apparatus to initiate operation of said calling device for transmission over said line, and means for connecting said transmission equipment to said line in response to a message or call directed to such station.

5. An automatic switching system comprising a plurality of switches controlled by calling currents, a plurality of paths selectable by said switches, a calling line, a calling device connectable to said line for repeatedly transmitting calling currents, means responsive to the initiation of a call to connect said calling device to said line, and means operative incident to the selection of a path by said switching apparatus for disconnecting said calling apparatus from said line.

6. In a communication system, the method of controlling automatic switches for selecting one of a plurality of paths which comprises, (1) repeatedly transmitting the same control currents to said automatic switches, (2) utilizing one or more repetitions of said control currents to control establishment of a connection away from said switches, and (3) upon the selection of a path by said switches interrupting the transmission of said control currents.

7. In a telephone switching system, in combination a subscriber's station, a central switching station, a voice frequency telephone communication path extending from said subscriber's station to said central station, calling apparatus at said subscriber's station for repeatedly transmitting currents representing the designation of a called station, telephone transmission equipment located at said subscriber's station, switching apparatus located at said subscriber's station and responsive to one polarity of currents transmitted over said line for connecting said calling apparatus to said line and responsive to another polarity of current applied to said line for disconnecting said calling apparatus from said line and connecting said telephone transmission equipment to said line.

8. A method of establishing communication paths through switching equipment which comprises the steps of (1) repeatedly transmitting for each call placed signals representing a called station designation to the switching equipment, (2) selecting certain portions of the signals and (3) employing the selected signals to control the switching equipment.

9. In a telephone switching system, a subscriber's station, a calling device located thereat, telephone transmission apparatus also located at said subscriber's station, a switching device located at said subscriber's station responsive to one polarity of current received over said line for disconnecting said transmission apparatus from said line and for connecting said calling device to said line, other equipment responsive to another polarity current received over said line for disconnecting said calling device from said line and connecting said transmission equipment to said line.

10. In a telephone switching system a subscriber's line circuit and station comprising calling signal transmitting equipment and communication equipment, switching means operated by one current condition received over said line for removing said calling equipment from said line circuit, other apparatus responsive to another current condition transmitted over said line for removing said communication equipment from said line circuit.

11. In a telephone switching system, a calling line circuit, a subscriber's station connected thereto, telephone communication apparatus located at said station, means responsive to one signaling condition received over said line for inserting said telephone communication apparatus in said line circuit at said subscriber's station, and other means responsive to another signaling condition received over said line for removing telephone communication apparatus from said line circuit.

12. In a telephone switching system, a subscriber's station, a central switching station, a calling signal transmitting device located at said subscriber's station, an electrical motor for operating said calling device, a transmission path extending between said subscriber's station and said central station, apparatus at said central station responsive to the initiation of a call at said subscriber's station for initiating the operation of said motor, and means operative incident to the completion of a switching operation at said central switching station for stopping the operation of said motor.

13. In a telephone switching system, a subscriber's station, a central switching station, a voice frequency telephone communication path extending between said stations, calling apparatus at said subscriber's station for repeatedly transmitting currents representing the designation of a called station over said voice frequency telephone communication path, and switching apparatus located at said subscriber's station responsive to one polarity of current applied to said path at the central switching station for connecting said calling apparatus to said voice frequency telephone communication path.

14. In a telephone switching system, a subscriber's station, a central switching station, a voice frequency telephone communication path extending from said subscriber's station to said central station, calling apparatus at said subscriber's station for repeatedly transmitting currents representing the designation of a called station over said voice frequency telephone communication path, telephone transmission equipment located at said subscriber's station, means responsive to one polarity of current applied to said path at the central switching station for connecting said calling apparatus to said voice frequency telephone communication path, means responsive to another polarity of current applied to said path for disconnecting said calling apparatus from said line and effectively connecting said telephone transmission equipment to said voice frequency telephone communication path.

15. In an automatic switching system, a switching mechanism controlled by calling currents, a calling line, a calling device connectable to said line for repeatedly transmitting calling signals to said switching mechanism, means responsive to the initiation of a call over said line for initiating the operation of said calling device, apparatus responsive to said calling signals for controlling said switching mechanism, and apparatus responsive to the establishment of an electrical path through said switching mechanism for stopping the operation of said calling apparatus.

16. In an automatic telephone switching system, a central switching station, a plurality of subscriber stations, lines connecting said subscriber stations to said central switching station, selective switching apparatus at said central switching station for selectively establishing signaling paths through said central switching station, a calling device located at a subscriber's station for repeatedly transmitting for each call placed to said central switching station calling signals designating a subscriber's station, apparatus responsive to one or more repetitions of said calling signals for controlling the establishment of a single path through said switching apparatus.

17. In an automatic telephone switching system, a central switching station, a subscriber station, lines connecting said subscriber's stations to said central switching station, selective switching apparatus at said central switching station, a calling device located at said subscriber's station for repeatedly transmitting to said central switching station for each call placed calling signals designating a subscriber's station, apparatus for selecting portions of one or more repetitions of said calling signals and means for controlling said switching apparatus in accordance with said selected portions of said signals.

18. In an automatic telephone switching system, a central switching station, a plurality of subscriber's stations, lines connecting said subscriber's stations to said central switching station, selective switching apparatus at said central switching station, a calling device located at a subscriber's station for repeatedly transmitting to said central switching station calling signals designating a subscriber's station, apparatus for selecting portions of one or more repetitions of said calling signals, means for controlling said switching apparatus in accordance with said selective portions of said signals, and means responsive to the operation of said switching apparatus for disassociating said calling apparatus from said line.

19. In an automatic switching system, a central switching station, a plurality of transmission paths, selective switching apparatus for selecting transmission paths, a subscriber's station connected to one of said transmission paths, an electrical power-operated calling device connectable to said one transmission path for repeatedly transmitting signaling currents over said one transmission path, means responsive to the initiation of a call to supply power to said calling device, receiving apparatus located at said central switching station for responding to said signaling currents transmitted over said transmission paths, control apparatus interconnected with said receiving apparatus and with said selective switching apparatus for selecting certain portions of one or more repetitions of said signaling currents for controlling a selection of a transmission path made by said selective switching apparatus.

20. In an automatic switching system, a plurality of transmission paths, a central switching station, selective switching apparatus for selecting one transmission path out of a plurality of transmision paths, a subscriber's station connectable to one of said paths, a calling device connectable to said path for repeatedly transmitting signaling currents over said path, means responsive to the initiation of a call to connect said calling device to said path, receiving apparatus located at said central switching station for responding to said signaling currents, apparatus for selecting certain portions of one or more repetitions of said signaling currents for controlling said selective switching apparatus to make a selection of a transmission path, means responsive to the completion of a selection by said selective switching apparatus for disconnecting said calling apparatus from said transmission path.

21. In a communication system, a method of controlling automatic switches for selectively establishing a single communication path through said switches which comprises, (1) repeatedly transmitting for each call placed the same control currents to said automatic switches, (2) selecting one or more portions of one or more repetitions of said control currents, (3) utilizing said selected portions to control the establishment of a connection by said switches and (4) stopping the repeated transmission of the said control currents upon the establishment of said connection by said switches.

22. In a communication switching system a switching station, selective switching apparatus located thereat, a communication line terminating thereat, means for repeatedly transmitting for each call placed control signals over said line, apparatus at said switching station for responding to control signals received over said line, means responsive to the improper operation of said receiving apparatus for preventing said receiving apparatus from controlling said switching apparatus in accordance with received signals.

23. In a communication switching system, a switching station, selective switching apparatus located thereat, a communication line terminating thereat, means for repeatedly transmitting for each call placed the same series of control signals over said line, apparatus at said central switching station for responding to control signals received over said line, means responsive to the reception of an improper number of said signals for preventing the control of said switching apparatus in accordance therewith.

24. In a communication switching system, a switching station, selective switching apparatus located thereat, a communication line terminating thereat, means repeatedly transmitting for each call placed control signals over said line, apparatus at said central switching station for responding to control signals received over said line, means responsive to the reception of a predetermined number of signaling currents of one repetition of said signals for controlling said switching apparatus in accordance with said one repetition of said received signals.

25. In a telephone switching system, a subscriber's station calling device located thereat for repeatedly transmitting two signaling pulses for each digit of a called subscriber's number variably spaced in time in accordance with the magnitude of the digit, a central switching station, a communication path extending from said subscriber's station to said central switching station, selective switching apparatus located at said central switching station, apparatus responsive to one or more of the repetitions of said pulses, means for selecting a portion of said pulses, apparatus responsive to the total number of said pulses, means responsive to a predetermined number of said pules for controlling said switching apparatus in accordance with said selected portion of said pulses, and apparatus responsive to numbers of received pulses other than said predetermined number of pulses for preventing the control of switching apparatus in accordance with said received pulses.

26. A telephone switching system comprising a subscriber's line and station comprising an electrical power-operated calling signal transmitting device for transmitting electrical calling signals, and switching means controlled by the current condition received over said line to apply power to said calling device.

27. A telephone switching system comprising a subscriber's station, a switching station, a calling signal transmitting device located at said subscriber's station, a transmission path extending between said stations, apparatus at said switching station responsive to the initiation of a call at said subscriber's station for initiating repeated operation of said calling device for operation over said line, and means operative incident to the completion of a switching operation at said switching station for preventing further operation of said calling device over said line during the remainder of the call.

28. A telephone switching system comprising a subscriber's station, an electrical power-operated calling signal transmitting device, a central station, apparatus at said central station responsive to a call to initiate the application of power to said calling device.

29. A telephone switching system comprising a subscriber's station, an electrical power-operated calling signal transmitting device, a central station, apparatus at said central station responsive to a call to initiate the application of power to said calling device, switching apparatus at said central station and means operative incident to the operation of said switching apparatus for interrupting the supply of power to said calling device.

WILLIAM A. MALTHANER.

REFERENCES CITED

The following references are of record in the file of this patent:

UNITED STATES PATENTS

| Number | Name | Date |
|---|---|---|
| 1,723,209 | Ruggles | Aug. 6, 1929 |
| 1,810,865 | Warwick | June 16, 1931 |
| 1,811,146 | Richardson | June 23, 1931 |
| 2,418,609 | Voss | Apr. 8, 1947 |